United States Patent
Plebani

(10) Patent No.: US 12,373,673 B2
(45) Date of Patent: Jul. 29, 2025

(54) COMPUTER-IMPLEMENTED DATA PROCESSING METHOD, MICRO-CONTROLLER SYSTEM AND COMPUTER PROGRAM PRODUCT FOR APPLYING POOLING WITH RESPECT TO AN OUTPUT BUFFER IN A NEURAL NETWORK

(71) Applicant: STMICROELECTRONICS S.r.l., Agrate Brianza (IT)

(72) Inventor: Emanuele Plebani, Sotto il Monte Giovanni XXIII (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 969 days.

(21) Appl. No.: 17/369,417

(22) Filed: Jul. 7, 2021

(65) Prior Publication Data
US 2022/0012569 A1  Jan. 13, 2022

(30) Foreign Application Priority Data
Jul. 13, 2020 (IT) .................. 102020000016909

(51) Int. Cl.
G06N 3/047 (2023.01)
G06N 3/10 (2006.01)

(52) U.S. Cl.
CPC ............ *G06N 3/047* (2023.01); *G06N 3/10* (2013.01)

(58) Field of Classification Search
CPC .......... G06N 3/047; G06N 3/10; G06N 3/045; G06N 3/063; G06N 3/08; Y02D 10/00; G06F 12/0207; G06F 18/241
See application file for complete search history.

(56) References Cited

U.S. PATENT DOCUMENTS

2019/0066257 A1*  2/2019  Daga ................. G06T 9/002
2020/0090023 A1*  3/2020  Joseph .............. G06N 3/063
(Continued)

FOREIGN PATENT DOCUMENTS

WO  2018/103736 A1  6/2018

OTHER PUBLICATIONS

Definition of "Array" in the Free On-Line Dictionary of Computing, available at https://foldoc.org/array (last updated Oct. 12, 2007) (Year: 2007).*

(Continued)

*Primary Examiner* — Omar F Fernandez Rivas
*Assistant Examiner* — Michael C. Lee
(74) *Attorney, Agent, or Firm* — Seed IP Law Group LLP

(57) ABSTRACT

A computer-implemented method applies a pooling operator to an input array of data, the pooling operator having an absorbing element value and a set of pooling parameters. A size of an output buffer is computer as a function of the set of pooling parameters. The elements of the output buffer are initialized to the value of the absorbing element of the pooling operator. The output array of data is generated by, for a plurality of iterations associated with respective pooling windows: associating, as a function of the pooling parameters, elements of the input array of a pooling window with output elements of the output buffer; and combining, for each output element of the output buffer, the respective input elements associated with the output element. The combining may include determining a combination of respective elements of the output buffer with the input elements associated with the output elements.

21 Claims, 12 Drawing Sheets

(56) References Cited

U.S. PATENT DOCUMENTS

| | | |
|---|---|---|
| 2020/0090046 A1* | 3/2020 | Sozubek ................ G06N 3/045 |
| 2020/0184331 A1 | 6/2020 | Demaj et al. |
| 2021/0026695 A1 | 1/2021 | Plebani et al. |
| 2021/0103550 A1* | 4/2021 | Appu ...................... G06F 17/16 |

OTHER PUBLICATIONS

Jie, Huang Jin, et al. "RunPool: A dynamic pooling layer for convolution neural network." International Journal of Computational Intelligence Systems 13.1 (Jan. 2020), pp. 66-76. (Year: 2020).*

Chen et al., "DianNao: A Small-Footprint High-Throughput Accelerator for Ubiquitous Machine-Learning," Proceedings of the 19th international conference on Architectural support for programming languages and operating systems, pp. 269-284, 2014.

* cited by examiner a)

b)

c)

d)

COMPUTER-IMPLEMENTED DATA PROCESSING METHOD, MICRO-CONTROLLER SYSTEM AND COMPUTER PROGRAM PRODUCT FOR APPLYING POOLING WITH RESPECT TO AN OUTPUT BUFFER IN A NEURAL NETWORK

BACKGROUND

Technical Field

The description relates to memory allocation methods and in particular to systems and memory allocation methods in artificial neural network (briefly, ANN) circuits.

One or more embodiments relate to processing circuitry including local memory circuit blocks and adapted to implement such ANN processing, for instance micro-controller units (briefly, MCUs).

One or more embodiments may be applied to hardware accelerators, for instance to speed up processing in artificial neural network circuits.

Description of the Related Art

Artificial neural network (ANN) circuits comprise computing frameworks configured to process large datasets.

As discussed herein, the word "dataset" or "data array" mainly refers to digitalized data (e.g., digital images) having an array data structure (briefly, array) comprising a collection of elements (values or variables) identified by at least one array index or key, in a way per se known. Linear array, also called one-dimensional array, is a common type of data structure, wherein input size may refer to the length of such a linear array.

ANN processing generally comprises two phases:
- a training stage wherein the ANN adaptively "learns" to perform tasks by considering examples (called training data set), generally without being programmed with any task-specific rules; and
- an inference stage, wherein the trained ANN may be used for making broad predictions about general input data.

For example, consider classifying whether an image represents a dog or a cat based on length and height of the object represented in the image. A training set may include thousands of [height, weight, cat/dog] arrays, such as [fifty, six, cat]. The artificial neural network may take this data and "learn" complex borders between cats and dogs based on height and weight. Then, given an unclassified data entry, the machine learning algorithm determines whether it is a dog or cat and a confidence level of the classification.

Various ANN models may be trained suitably for application in different domains, e.g., ANNs can be used to learn word patterns in sentences or Keyword Spotting, to prevent tool faults as in predictive maintenance, for (e.g., inertial) sensors) signal processing as in Human Activity Recognition, for image processing and classifying objects in images and for many other learning-based tasks too.

In general, an ANN may be arranged in a plurality of "layers" and different types of data processing operations may be performed at different ANN layers.

Execution speed of such data processing operations may heavily rely on how software code is mapped on the computational and memory resources employed.

The types of data processing operations (or functions) which may be performed at ANN layers, applying a suitable operator (or function) to the data to process, may comprise applying pooling and/or convolution operators.

A pooling operator may be applied to data in order to compute a "combining" operation on a region of the input data provided.

Specifically, applying pooling to an array comprises processing data within a given "(pooling) window" or "(pooling) region" which is moved/slid progressively over areas/regions of the input according to a certain progression stride, e.g., distance traversed per sliding, wherein a single output value is computed as a function of the data collected within the sliding window.

There are many types of pooling layers or operators, for instance known ones are:
- applying a "maximum pooling" (briefly, max-pool) operator to an input array may yield an output array whose elements are obtained by detecting the maximum value within the window at each stage in which it is orderly slid over the array; and
- applying an "average pooling" (briefly, avg-pool) operator to an input array may yield an array whose elements are obtained by computing the average of array-values within the window at each stage in which it is orderly slid over the array.

A pooling layer may be customized varying its parameters, which are per se known, for instance:
- pooling window size/shape, e.g., (c);
- padding size, e.g., (p); and
- stride size, e.g., (s).

As mentioned, the stride is the length of the "traveled distance" (in terms of array indexes) of the pooling window in between output value computations.

Padding size relates to how array "edge" computations may be treated when applying pooling: for instance if the input array is a linear array of an even length, for instance 8, and the pooling window has size (c)=3 and stride (s)=3, then there is a problem at the "end" of the array when moving the window to the last block of data, since there is an index "missing". To obviate this, padding size (p)=1 can increase the height and width of the output, filling the excess space with null values, ensuring that the pooling window is applied to a full input.

Programming a computer to perform pooling operations may involve allocating memory space to host temporary data, also known as buffer size.

Improving the memory occupation and speed of computation of pooling operations is an important figure of merit for artificial neural networks, in particular for CNN hardware accelerator circuits.

BRIEF SUMMARY

In an embodiment, a method comprises: applying a pooling operator to an input array of data, the pooling operator having an absorbing element value and a set of pooling parameters, the applying the pooling operator to the input array of data comprising: computing a size of an output buffer as a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array of a pooling window with output elements of the output buffer; and combining, for each output element of the output buffer, the respective input elements associated with the output element. In an embodiment, the combining includes determining a combination of respective elements of the output buffer with the input elements associated with the output elements.

In an embodiment, a micro-controller system comprises: memory; and processing circuitry coupled to the memory, wherein the processing circuitry, in operation, applies a pooling operator to an input array of data, the pooling operator having an absorbing element value and a set of pooling parameters, the applying the pooling operator to the input array of data comprising: allocating a portion of the memory to an output buffer, the output buffer having a size that is a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array of a pooling window with output elements of the output buffer; and combining, for each output element of the output buffer, the respective input elements associated with the output element. In an embodiment, the combining includes determining a combination of respective elements of the output buffer with the input elements associated with the output elements.

In an embodiment, a non-transitory computer-readable storage medium whose stored contents configure a computing system, implements a method, the method comprising: applying a pooling operator to an input array of data, the pooling operator having an absorbing element value and a set of pooling parameters, the applying the pooling operator to the input array of data comprising: computing a size of an output buffer as a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array with output elements of the output buffer; and combining, for each output element of the output buffer, the respective input elements associated with the output element. In an embodiment, the combining includes determining a combination of respective elements of the output buffer with the input elements associated with the output elements.

BRIEF DESCRIPTION OF THE SEVERAL VIEWS OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings.

The term "couple" and similar terms do not necessarily denote direct and immediate connections, but also include connections through intermediate elements or devices.

Also, in the following, a circuit implementing (via HW and/or SW) a neural network, namely an artificial neural network (ANN) circuit may be referred to briefly as a "neural network" in order to avoid making the instant description unduly cumbersome.

As mentioned, ANN processing 100 may comprise multiple data processing operations performed on an input array.

Such data-processing operations may be performed in an automated way using at least one processing circuit, for instance a micro-controller circuit unit.

Figure 1:
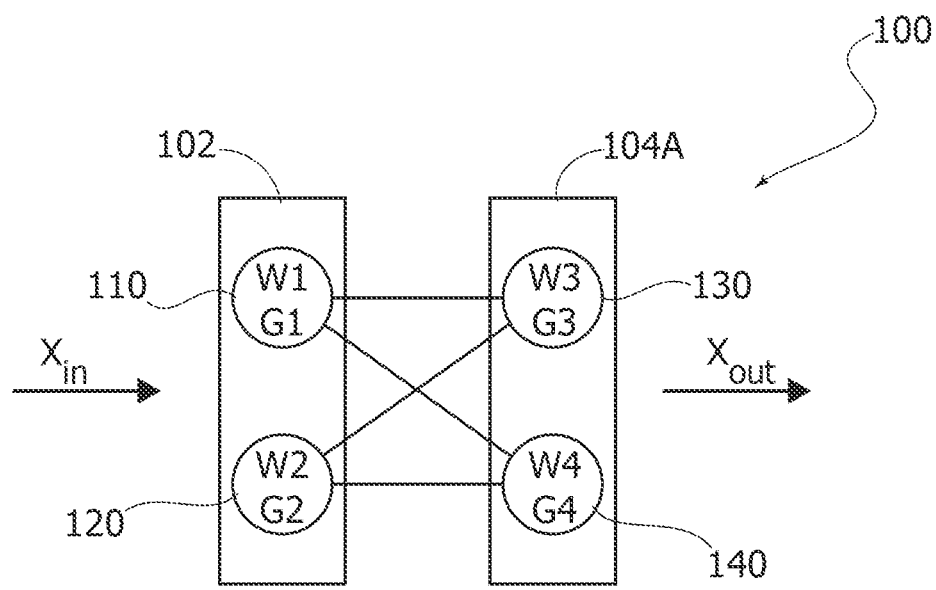
FIGS. 1 and 2 are exemplary diagrams of artificial neural network processing.

FIG. 1 illustrates a possible diagram of an artificial neural network (briefly, ANN) 100, comprising:

an input layer 102, having a first input node 110 and a second input node 120, the input layer 102 being configured to receive an input array Xin, for instance x=(Xin(1), Xin(2))=(length, height); and an output layer 104, having a first output node 130 and a second output node 140, the output layer 104 being configured to provide to user circuits at least one output array Xout, for instance outputs Xout=(Xout(1),Xout(2))=(cat, dog).

ANN processing nodes 110, 120, 130, 140 may comprise processing units, for instance "perceptrons" as in multi-layer perceptron processing, and/or cells or multi-layer units in recurrent neural network processing, and so on.

In the following, for the sake of simplicity, one or more embodiments are mainly discussed with respect to perceptron-type processing units, being otherwise understood that such a type of ANN processing unit is purely exemplary and in no way limiting.

ANN processing nodes/units 110, 120, 130, 140 may be configured to process data received using respective sets of weights W1, W2, W3, W4 and activations G1, G2, G3, G4 which may be stored in a memory circuit portion of the processing circuit used to perform ANN processing.

In one or more embodiments, ANN processing 100 may further comprise so-called "hidden layers" in which perceptrons coupled to other neurons in the network and hence not directly accessible from input and output layers, which indicate that processing may occur with a higher number and more complex architecture of perceptrons than in one layer, for instance in order to process bidimensional images.

The units 110, 120, 130, 140 of the layers 102, 104 may be coupled to input nodes of each unit of the downstream layer (which may be referred to as a "fully connected feed forward" topology) and, optionally, to a bias input node.

In one or more embodiments, an ANN processing framework 100 may be modeled as a Directed Acyclic Graph (briefly, DAG).

For the sake of simplicity, a DAG model comprising six sequential nodes is discussed in the following with respect to FIG. 2, being otherwise understood that such a quantity of nodes and such a DAG topology are purely exemplary and in no way limiting. One or more embodiments may relate to ANN processing frameworks 100 which may be modeled as a DAG with different number of nodes and different topologies.

Figure 2:
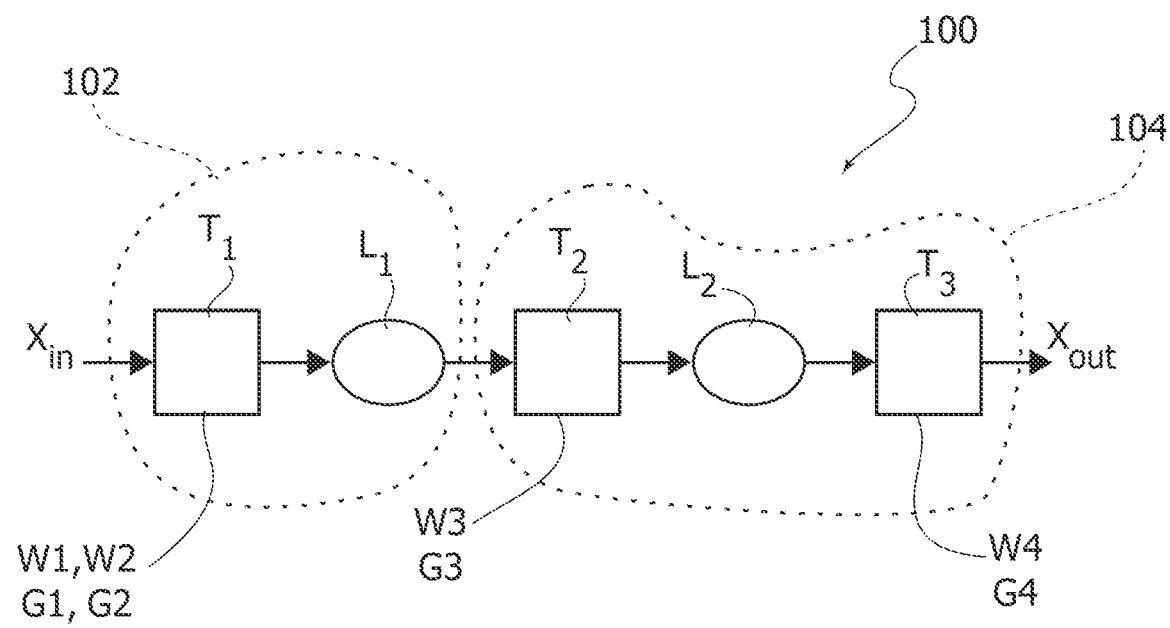

In one or more embodiments as exemplified in FIG. 2, the Directed Acyclic Graph (DAG) may comprise a set of data processing nodes T1, L1, T2, L2, T3, wherein nodes in the set of data processing nodes T1, L1, T2, L2, T3, may belong to either of two sets of nodes:
- a first set of "layer" nodes L1, L2, (represented using circles in FIG. 1), which comprise data processing operators of the artificial neural network 100; and
- a second set of "tensor" nodes T1, T2, T3, (represented using squares in FIG. 1), which are indicative of memory access or memorization stages in the neural network processing framework 100.

Specifically:
- any node in the first set of layer nodes L1, L2, includes at least one data processing operator configured to be applied to data in any (processing and/or multi-) layer (unit) 102, 104 of ANN processing 100; and
- any node in the second set of nodes T1, T2, T3, includes at least one data storage operation linked to a respective data processing stage L1, L2, of the artificial neural network, in order to load perceptron weights W1, W2, W3, W4 and/or activations G3, G4, and store outputs of the linked neural network layer node L1, L2.

As mentioned, in the considered (non-limiting) example of perceptron nodes 110, 120, 130, 140, weights W1, W2, W3, W4 and/or activations G1, G2, G3, G4 of ANN perceptrons 110, 120, 130, 140 in respective ANN layers 102, 104 may be stored in a memory circuit portion of a processing circuit.

Figure 3:
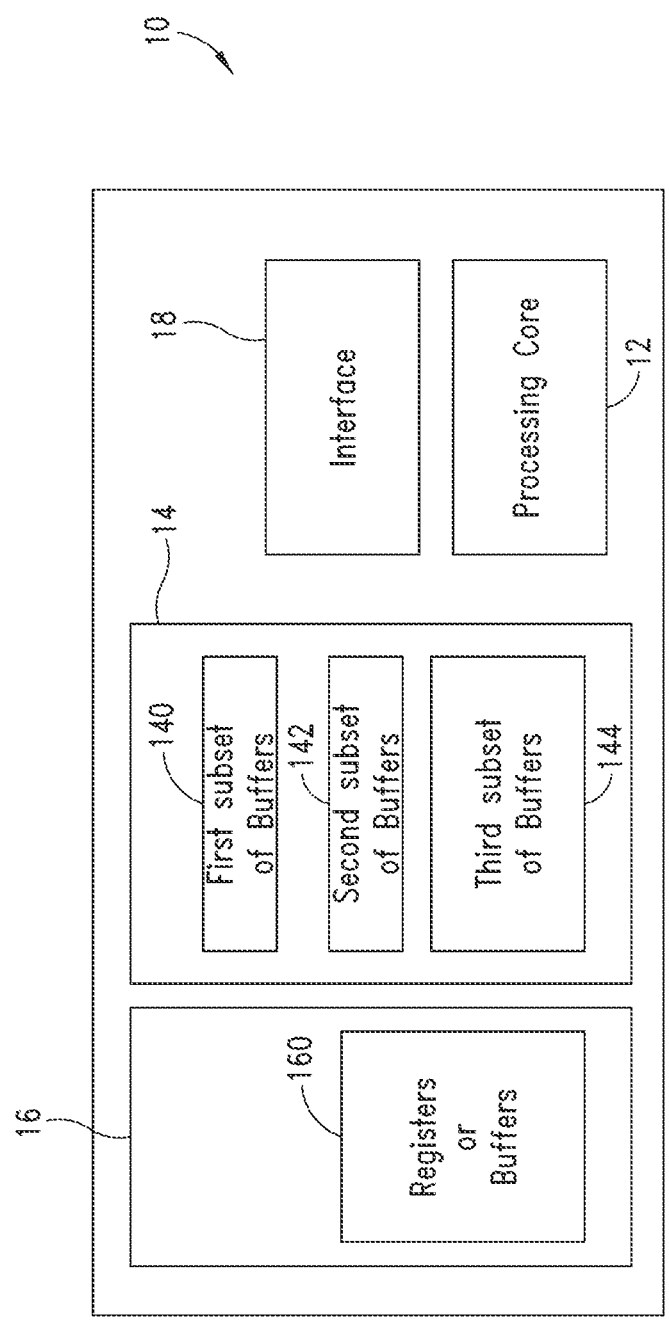
FIG. 3 is a diagram of a micro-controller circuit according to one or more embodiments.

FIG. 3 is an exemplary diagram illustrating an exemplary, e.g., computer processing system 10 adapted to implement one or more portions of the ANN 100.

Such a system 10 may comprise a micro-controller processing circuit, e.g., a general-purpose one. In one or more embodiments, the micro-controller (briefly, MCU) 10 may comprise a processing core or circuitry 12 and a set of memory circuit portions 14, 16. The MCU 10 may further comprise:
- a circuit portion or interface 18 configured to couple the MCU to other processing units or actuating devices, e.g., known as peripherals, in a way per se known; and
- networking means between processing unit and memory to exchange data therebetween, e.g., via data buses (not visible in FIG. 3 for the sake of simplicity); such networking means may comprise any of several types of well-known bus structures using any of a variety of bus architectures, e.g., Industry Standard Architecture (ISA) bus, Micro Channel Architecture (MCA) bus, Enhanced ISA (EISA) bus, Video Electronics Standards Associate (VESA) local bus and Peripheral Component Interconnect (PCI).

Various components connected to the system bus include, but are not limited to, expandable non-volatile memory (e.g., disk based data storage), video/graphics adapter, user input interface (I/F) controller configured to be connected to one or more input devices such as a keyboard, peripheral interface controller configured to be connected to one or more external peripherals such as printer, and a network interface controller which may be coupled to one or more devices, such as data storage, remote computer running one or more remote applications, via a network which may comprise the Internet cloud, a local area network (LAN), wide area network (WAN), storage area network (SAN).

The processing core or circuitry 12 may comprise one or more general purpose CPU cores and optionally one or more special purpose cores (e.g., DSP core, floating point, GPU, and neural network optimized core), wherein the one or more general purpose cores execute general purpose opcodes while the special purpose cores execute functions specific to their purpose.

The set of memory circuit blocks 14, 16 may comprise cache registers, dynamic random-access memory (DRAM) or extended data out (EDO) memory, or other types of memory such as ROM, static RAM, flash, and non-volatile static random-access memory (NVSRAM), bubble memory, etc.

The system 10 may operate in a networked environment via connections to one or more remote computers. The remote computer may comprise a personal computer (PC), server, router, network PC, peer device or other common network node, and typically includes many or all of the elements discussed in the foregoing.

It is noted that other digital computer system configurations can also be employed to implement the system and methods of the present disclosure, and to the extent that a particular system configuration is capable of implementing the system and methods of the present disclosure.

In one or more embodiments, the set of memory circuit portions 14, 16 may comprise a first memory circuit portion 14 configured to provide data to user circuits with a first memory accessing speed, for instance a RAM-type memory, and a second memory circuit portion 16 configured to provide data to user circuits with a second memory accessing speed different from the first, for instance a flash-type memory.

In one or more embodiments, the first memory portion 14 may comprise a plurality of registers or buffers, for instance:
- a first subset of buffers 140 configured to store application specific data portions, for instance an input dataset for the ANN;
- a second subset of buffers 142 configured to store ANN processing code portions; and
- a third subset of buffers 144 configured to store activations G1, G2, G3, G4 of ANN perceptron nodes 110, 120, 130, 140 of respective ANN processing layers 102, 104, wherein an activation is an output of a layer.

In one or more embodiments, the second memory portion 16 may comprise a further plurality of registers or buffers 160 which may be configured to store the weight values W1, W2, W3, W4 of ANN perceptron nodes 110, 120, 130, 140 of respective ANN processing layers 102, 104.

In one or more embodiments, activations may be computed on-the-fly while performing data processing.

In order to speed up the execution of ANN operations and the performance of the MCU system 10, a buffer may be pre-allocated before run-time of the ANN 100, for instance before data to be processed is provided to the ANN input layer nodes.

Italian Patent Application n. 102019000012609 filed on Jul. 22, 2019 by the Applicant discusses a computer-implemented memory allocation method which may be suitable for use in one or more embodiments to improve performance of the MCU system 10 in applying ANN processing 100 to input arrays Xin.

Such a computer implemented method may comprise:
- providing data processing circuitry for the artificial neural network circuit 100, the data processing circuitry including data buffers T1, T2, T3, in a memory circuitry;
- coupling the data buffers T1, T2, T3 in the memory circuitry to respective processing layers L1, L2, in the artificial neural network circuit 100 and obtaining an ordered visiting sequence of layers of the artificial neural network 100;
- producing, as a function of the ordered visiting sequence of layers of the artificial neural network 100, a (virtual) memory allocation schedule, the memory allocation schedule A including a set of instructions for memory allocation and de-allocation operations applicable to the data buffers T1, T2, T3 in the memory circuitry 14, 16 coupled to processing layers of the artificial neural network circuit 100; and
- computing, as a function of the memory allocation schedule, a (physical) memory configuration data structure for the artificial neural network circuit 100, the physical (or virtual) memory configuration dataset comprising sizes and addresses of physical memory locations for the artificial neural network circuit 100.

In one or more embodiments, merging two-layer operators may provide further memory savings, as a result of, for instance, removing an intermediate buffer.

As mentioned, discussed herein is a method of (further) improvement of applying artificial neural network processing 100, in particular when using MCU circuits 10, in order to streamline processing and reducing memory access times.

For the sake of simplicity, principles underlying one or more embodiments are discussed with reference to an exemplary case, wherein:

- an input array Xin, for instance a linear input array having given length size L, e.g., L=9; for the sake of simplicity, the considered input array Xin is held to comprise a unitary vector, meaning a vector whose elements are all unitary values, for instance Xin=[A,B,C,D,E,F,G,H,I]= [1,1,1,1,1,1,1,1,1];
- the input array Xin is processed using a pooling processing operator PF having a given pooling window PW with pooling window size c and having a pooling stride size s, e.g., c(PF)=6, s(PF)=1;
- at least one buffer is associated to the pooling operator PF and configured to store inputs and/or outputs of the pooling operator, as discussed in the following;
- an output signal Xout provides values of the pooling operator when computed on a portion of input data having size equal to the pooling window PW, the pooling operator being a "sum" pooling operator, the output of PF is the sum of all elements within a pooling window (for instance, an average pooling operator may be obtained by dividing the sum pooling operator output by the input length value L); and
- operations of reading/writing/summing data may be synchronized via a temporization signal CK (for instance, a physical clock signal or a loop/cycle index) and data loaded at one cycle is available at the subsequent discrete cycle, in a way per se known, wherein such cycles may be indicated as "epochs".

Figure 4A:
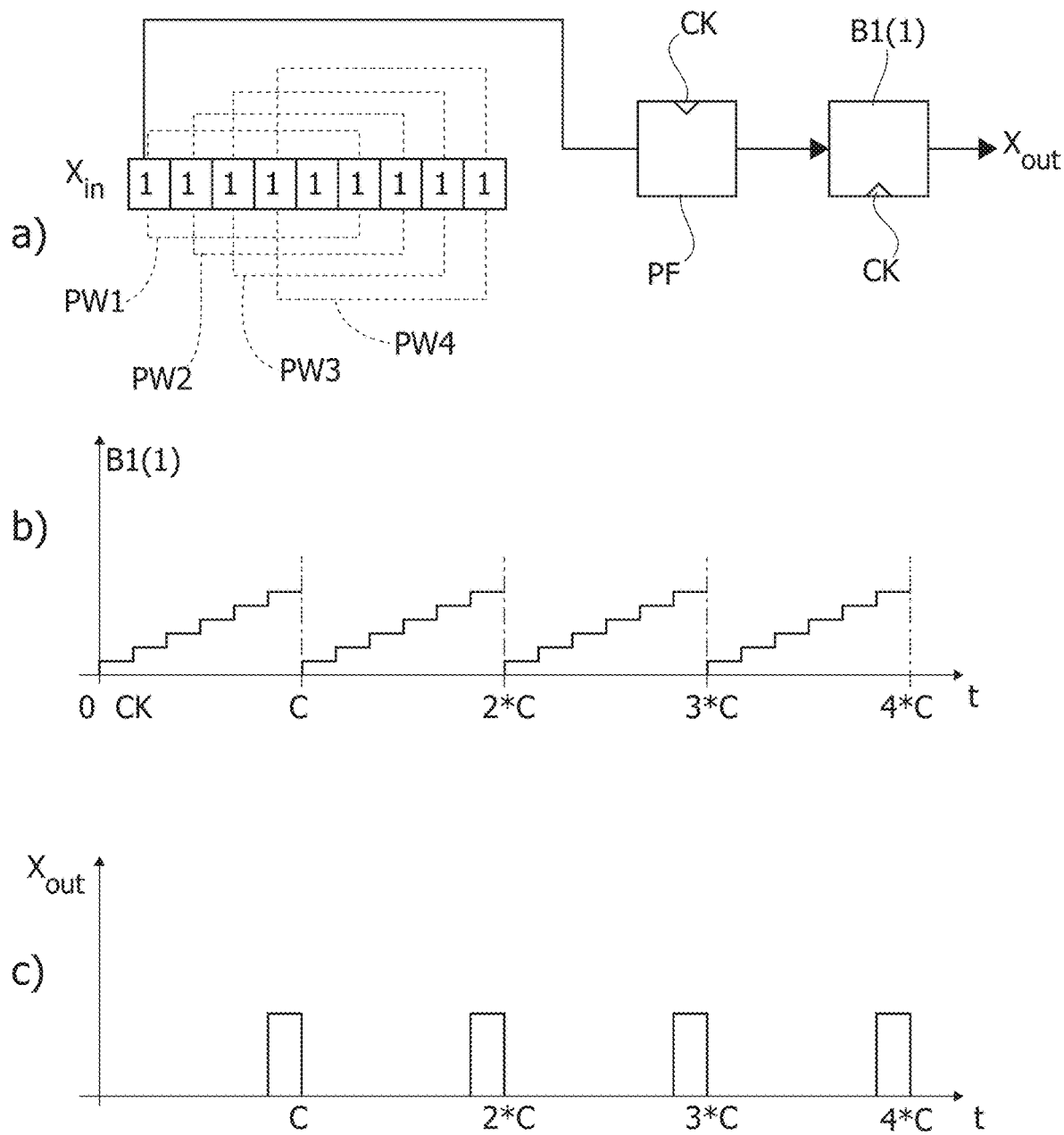
FIG. 4A comprises portions a), b) and c) comprising diagrams of signals involved in a first method of pooling.

In a first "naïve" method of applying pooling to the input array Xin, as exemplified in FIG. 4A, a first buffer B1(1) having a minimum buffer space allocated, e.g., of one memory unit, may be used to perform pooling. Such a solution may involve nevertheless high computational costs in terms of RAM memory size and of latency of computation, as discussed in the following.

A first "naïve" implementation of pooling may envisage computing a pooling output value as soon as all the input values within a pooling window are available for accumulation.

As exemplified in FIG. 4A, applying the pooling operator PF of the first "naïve" implementation may comprise:
- as exemplified in portion a) of FIG. 4A, applying the pooling window to the input data Xin in subsequent windows PW1, PW2, PW3, PW4, wherein each window is separated from the sequent by an index-element distance equal to the stride size, for instance distance of one element;
- the respective data windows are "scanned" and each value comprised in each window is accumulated in memory B1(1), whose possible stored values in time are exemplified in portion b) of FIG. 4A; and
- an output signal Xout is provided at the end of each accumulation cycle, as in portion c) of FIG. 4A.

As exemplified in FIG. 4A, with this first "naive" method, it takes a number of clock cycles equal to the pooling window size c to provide a single output value of the pooling operator PF. The total output values of the pooling operator PF take a certain number of clock cycles to be output. Such a number of clock cycles may be a multiple of the pooling window size by a factor depending from the amount of overlap among subsequent pooling windows PW1, PW2, PW3, PW4. For instance, in the example considered, the total computational latency of applying the pooling operator PF is 4*c=24 clock cycles.

Figure 4B:
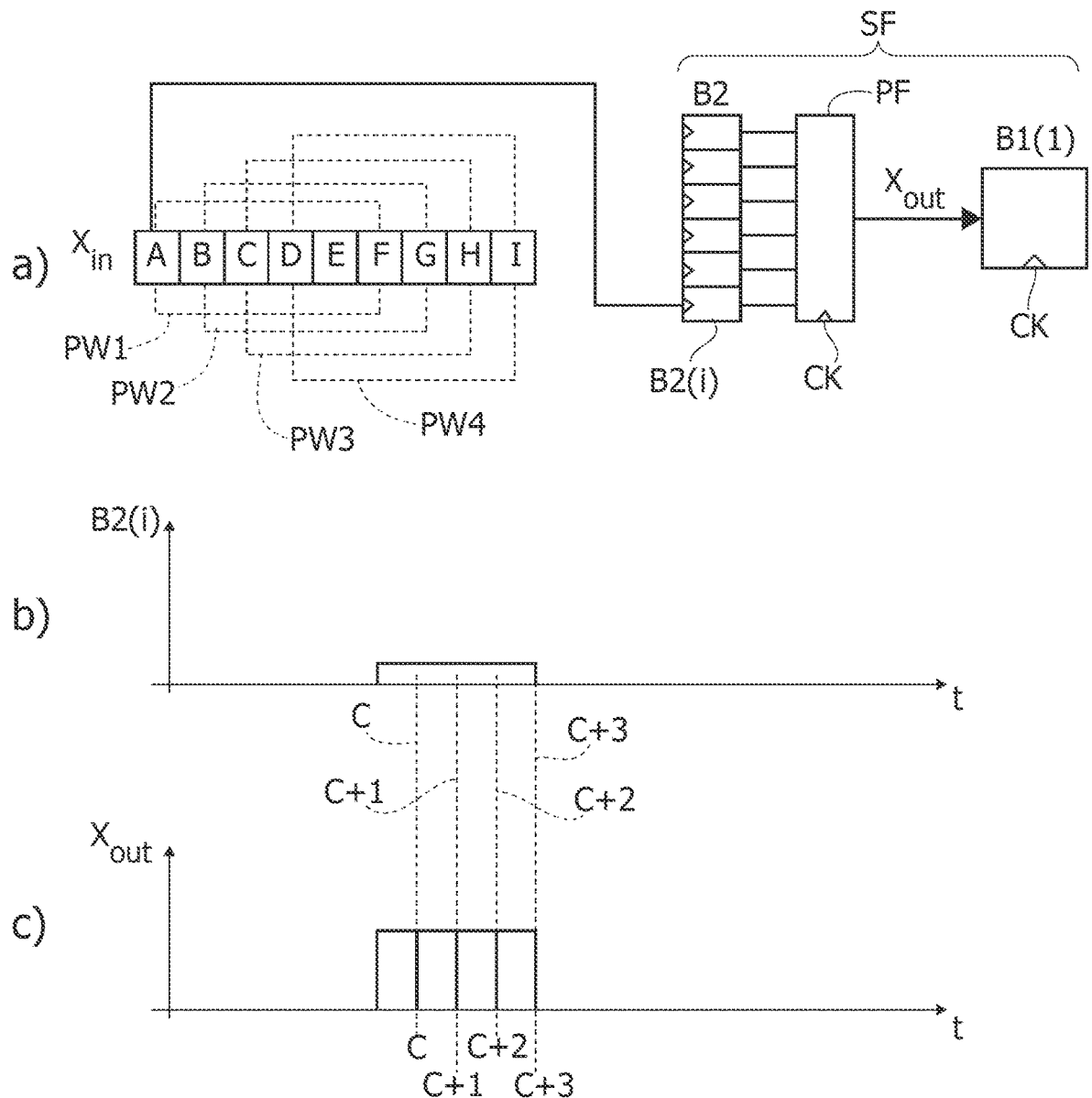
FIG. 4B comprises portions a), b) and c) comprising diagrams of signals involved in a second method of pooling.

A second method of applying the pooling operator as exemplified in FIG. 4B, which may be indicated as "striped pooling implementation" SF, may comprise allocating a temporary buffer B2, having a size equal to a width of the image/array (which in the exemplary one-dimensional case consider is equal to the size c of the pooling window PW, (e.g., size(B2)=c), the buffer B2 configured to store data within pooling windows PW1, PW2, PW3, PW4. Such a stripe buffer B2 may be used as temporary buffer to store of a row/column of a pooling window PW of input data Xin.

Figure 5:
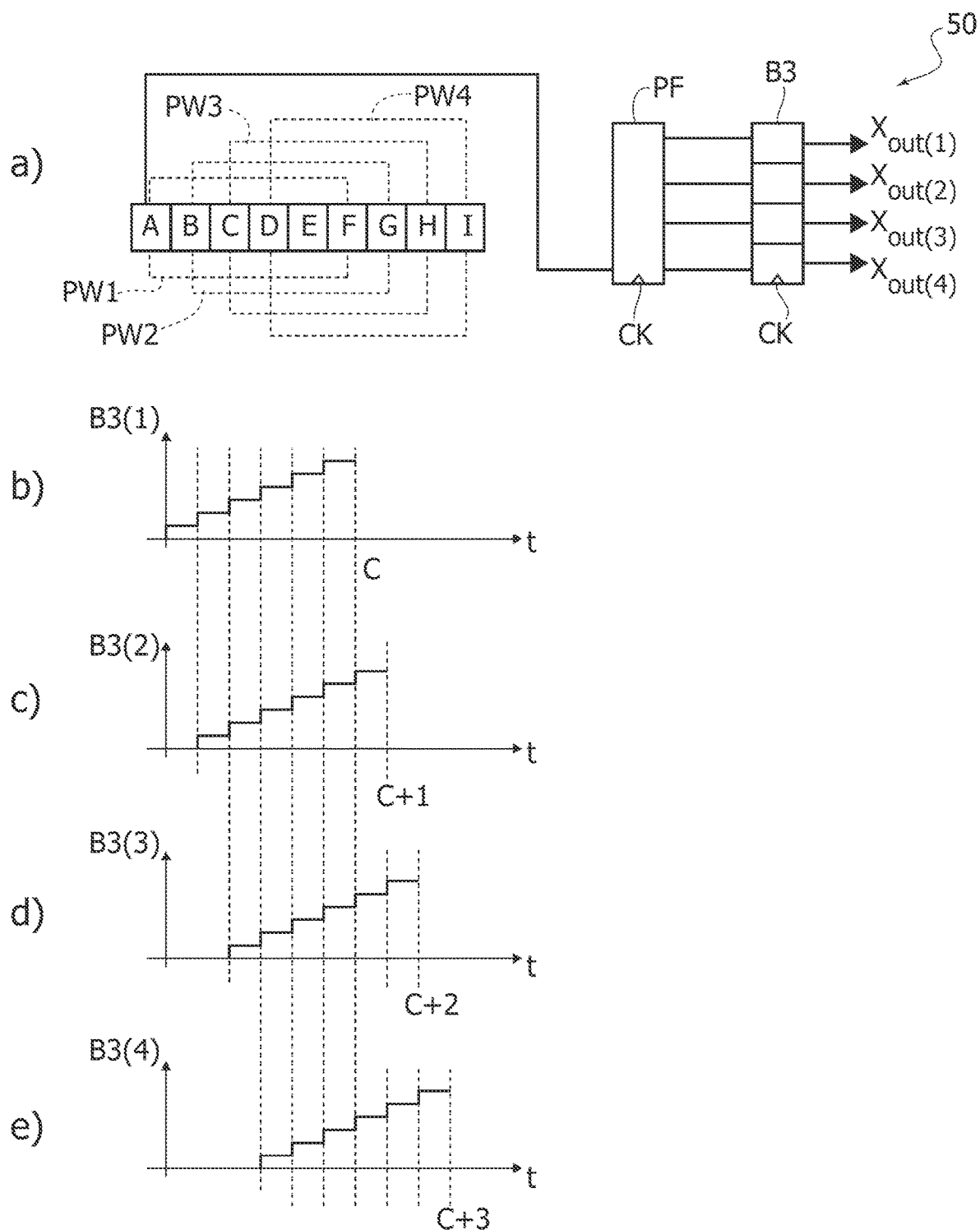
FIG. 5 comprises portions a), b), c), d), e) comprising diagrams of principles underlying one or more embodiments.

As exemplified in FIG. 4B, applying a striped pooling operator SF of the striped pooling implementation may comprise:

as exemplified in portion a) of FIG. 4B, applying the pooling window to the input data Xin in subsequent windows PW1, PW2, PW3, PW4, wherein each window is separated from the sequent by an index-element distance equal to the stride size s, for instance distance of one element;

the respective data windows are "scanned", values comprised in the first window PW1 are sequentially loaded in subsequent indexed memory portions B2($i$) of the stripe temporary buffer B2, as exemplified in portion b) of FIG. 5 showing possible time diagrams of values stored in one i-th memory portion B2($i$) of the stride temporary buffer B2; and an output signal Xout is provided whenever all data which belongs to a respective pooling window PW1, PW2, PW3, PW4 is loaded and available to be accumulated in a subsequent buffer unit B1, computing the pooling operator at the end of each accumulation cycle, as exemplified in portion c) of FIG. 4B.

In one or more embodiments, output values Xout may be available for further processing at a time linearly proportional to the pool size value, e.g., at time c+3.

In one or more embodiments, the stripe is treated as a circular buffer of rows to avoid copies.

Such a striped implementation may be limited in that not all pooling operator parameter values may be suitably used, so that a tuning of pooling operator parameter values may be employed. Problems may arise when pooling image data at the "edges" of the image, when a partial stripe of input data may be left to store in the stripe buffer B2, B2'.

As exemplified in FIG. 4B, with this second "striped" method, it takes a number of clock cycles equal to the pooling window size c to provide a first output value of the pooling operator PF. The total output values of the pooling operator PF take a total number of clock cycles to be output which is proportional to a ratio of input over stride size. For instance, in the example considered, the total computational latency of applying the pooling operator PF is c+3=9 clock cycles, which facilitates a reduction of computational cost.

Substantially, between time c and time c+1 at least one element is substituted in the striped buffer B2. Specifically, element A is substituted with element G. Analogously, between time c+1 and time c+2, element B is substituted with element H in the striped buffer B2. Consequently, element C is substituted with element I in the striped buffer B2.

Hence, while the naive implementation presents, at least, the drawback of using repeated evaluations of the inputs, the striped implementation presents, at least, the drawback of using temporary storage for the input values.

Other drawbacks of the striped implementation may be:
use of an amount of temporary memory, e.g., RAM, to host the temporary buffer B2 which is proportional to the width of the input; and
in case of partial pooling regions, that is in cases in which pooling window size and input data size are not multiple therebetween (with optional non-zero padding), the state of the stripe depends on the stride, pad, and size of the pooling region, leading to several "special" cases to be handled, leading to a "bug-prone" implementation.

Figure 4C:
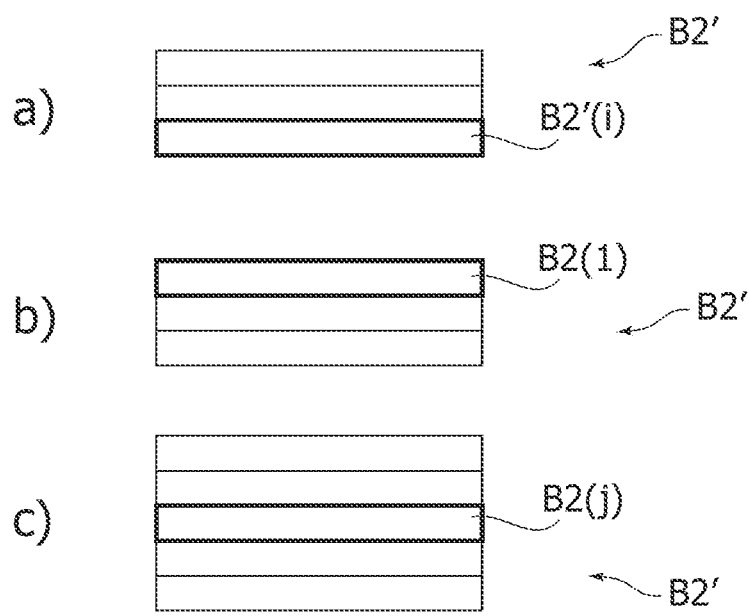
FIG. 4C comprises portions a), b), c) comprising diagrams relative to buffer-loading errors.

Some examples of configurations involving partial pooling region scenarios in the stripe buffer are exemplified in FIG. 4C, wherein an exemplary stripe buffer B2' is treated as a circular buffer of rows to avoid copies.

As mentioned, problems may arise in applying pooling data processing for instance when processing image data when the application is performed at the edges of the image, wherein a partial stripe of data may be left.

As exemplified in portion a) of FIG. 4C, in a first exemplary case input size and stride size may lack a common dividend/multiple. For instance, this may be the case when:
input size L may have a first input value, e.g., L=8;
pool size may have a first pool size value, e.g., c=3; and
stride size may have a first stride size, e.g., s=3.

In such a first example as exemplified in portion a) of FIG. 4C, a last pooling region to be computed when applying (striped) pooling processing SF (with pool size 3 and stride size 3) to the input data Xin (with input size 8) is partially filled with data because input data size to pool size ratio is not integer, e.g., 8 mod 3=2. In such an exemplary scenario, the stride buffer B2 would store "valid" data only partially, and when applying pooling SF, PF a problem may arise when computing the output value Xout as a sum of valid values with a non-valid value.

As exemplified in portion b) of FIG. 4C, in a second exemplary case, stride size may be smaller than pool size; for instance, this may be the case when:
input size L may have a second input value, e.g., L=6;
pool size may have a same pool size value, e.g., c=3; and
stride size may have a second stride size, e.g., s=2.

In such a second example as exemplified in portion b) of FIG. 4C, when performing the applying pooling SF, PF to the first pooling region, the stride buffer B2' may have a partially filled region comprising non-valid values may be located in any portion of the stride buffer B2', for instance to a first element B2'(1) of the stride buffer B2', e.g., B2'(1) equal to a value previously written or to an evidently erroneous value such as B2'(1)=NaN.

As exemplified in portion c) of FIG. 4C, in a third exemplary case, stride size may be much smaller than pool size; for instance, this may be the case when:
input size L may have a second input value, e.g., L=7;
pool size may have a same pool size value, e.g., c=5; and
stride size may have a second stride size, e.g., s=3.

In such a second example as exemplified in portion b) of FIG. 4C, the last pooling region may be filled starting in the middle and may wrap around in the buffer, but a middle element B2'($j$) of the buffer B2' may still comprise non-valid data due to partial filling.

Striped pooling SF may use specific code to handle each of these "special cases" using specific software code portions, providing a computer program product with expensive maintenance costs.

In conclusion, memory allocation methods discussed in the foregoing present drawbacks of, either:
repeating computations when pooling regions are overlapped, increasing latency and inefficiency; or
using a stripe (buffer encompassing several rows) to cache results, with the problem of managing different edge cases depending on the buffer content.

One or more embodiments may be based on the observation that pooling operation may be improved when a relation may be established between input data elements Xin and output data elements Xout, finding output elements affected by a given input value element, facilitating obtaining a single access to input data Xin and a stripe of "active" output data elements (for instance, output array indexes or coordinates) instead of active input elements (for instance, input array indexes or coordinates).

One or more embodiments may comprise providing an output buffer B3 having a size $d_o$ which may be computed "offline" or "a priori" as a function of the parameters c, s of the pooling operator VF. As a result, as mentioned, the pooling operator VF computes solely the values in the inferred output region.

In one or more embodiments, output buffer size $d_o$ may be computed in a way selectable from among different options, for instance via performing output shape inference processing comprising processing pooling parameters.

For instance, such selectable different options may comprise:

a first output buffer size $d_{of}$ may be computed performing a sort of "floor strategy", which may be expressed as:

$$d_{of} = \max(\lfloor d_i - c + p_{left} + p_{right} \rfloor / s \rfloor, 1)$$

wherein
c: pooling window size,
s: stride size,
$p_{left}$=pad size on the left edge,
$p_{right}$=pad size on the right edge, and
$d_i$=input array length-size.

a second output buffer size $d_{oc}$ may be computed using a sort of of "ceiling approximation", which may be particularly suited for non-zero pad size and which may be expressed as:

$$d_{oc} = \lceil (d_i - c + p_{left} + p_{right}) / s \rceil + 1$$

a third output buffer size $d_{op}$ may be computed when no padding is envisaged and pad size is zero, which may be expressed as:

$$d_{op} = \lceil (d_i + s - 1)/s \rceil + 1$$

Specifically, inventors have observed that a value shared by multiple (overlapped) pooling regions is combined with the value of each pooling region.

Any j-th input element Xin(j) contributes to the computation of the value of certain i-th output elements Xout(i). Such indices of i-th elements Xout(i) "affected" by an input which fall within a pooling window may be computed preliminary to operating the pooling (as their values are a pooling region) and the input values are "reused" or "folded" in each computation cycle.

Such a solution facilitates reducing input loading operations, for instance up to visiting them only once, providing a streamed processing mode.

As exemplified in FIG. 5, applying such a method 50 of performing an "inverted" pooling operator VF of the striped pooling implementation may comprise:

as exemplified in portion a) of FIG. 5, applying the pooling window PW to the input data Xin in subsequent windows PW1, PW2, PW3, PW4, wherein each window is separated from the sequent by an index-element distance equal to the stride size s, for instance distance of one element;

the respective data windows are "scanned", wherein values comprised in the first window PW1 are simultaneously accumulated in subsequent indexed memory portions B3(i) of the stripe temporary buffer B3, as exemplified in portions b) to e) of FIG. 5 showing possible time diagrams of values stored in an output buffer B3 configured to store four elements B3(1), B3(2), B3(3), B3(4); and an output signal Xout(i) is provided whenever data which belongs to a respective pooling window PW1, PW2, PW3, PW4 has been accumulated in the output buffer B3, e.g., fully accumulated after an optional finalization, computing the pooling operator concurrently with the loading of data as exemplified in portions b) to e) of FIG. 5 and as discussed in the following.

Specifically, in the considered example as exemplified in portions b) to e) of FIG. 5, for instance:

during a first clock cycle, a first value A of a first element of the input data Xin within a first pooling window PW1 may be loaded to a first element B3(1) of the output buffer B3;

in a subsequent second clock cycle, a second element B of the input data Xin within the first pooling window PW1 may be accumulated in the first element B3(1), that is added to the first value A stored in the first element B3(1), and loaded to a second element B3(2) of the output buffer B3;

in a subsequent third clock cycle, a third element C of the input data Xin within the first pooling window PW1 may be simultaneously accumulated in the first element B3(1), accumulated in the second element B3(2) and loaded to a third element B3(3) of the output buffer B3;

in a subsequent fourth clock cycle, a fourth element D of the input data Xin within the first pooling window PW1 may be simultaneously accumulated into the first B3(1), second B3(2) and third element B3(3), while being loaded to a fourth element B3(4) of the output buffer B3;

in subsequent fifth, a fifth element E of the input data Xin within the first pooling window PW1 may be simultaneously accumulated to the first element B3(1), the second element B3(2), the third element B3(3) and a fourth element B3(4) of the output buffer B3; and finally, in a sixth clock cycle, a sixth element F of the input data Xin within the first pooling window PW1 may be simultaneously accumulated to the first element B3(1), the second element B3(2), the third element B3(3) and a fourth element B3(4) of the output buffer B3, the first element B3(1) being configured to provide the accumulated result as an output value Xout(1) to user circuits.

As exemplified in portion c) of FIG. 5, in a seventh clock cycle a second output value Xout(2) may be provided as a result of the accumulation of data within the second pooling window being completed in the second element of the output buffer B3(2).

As exemplified in portion d) of FIG. 5, in an eight clock cycle a third output value Xout(3) may be provided as a result of the accumulation of data within the second pooling window being completed in the third element of the output buffer B3(3).

As exemplified in portion e) of FIG. 5, in a ninth clock cycle a fourth output value Xout(4) may be provided as a result of the accumulation of data within the second pooling window being completed in the fourth element of the output buffer B3(4).

It is noted that the examples discussed in the foregoing are purely exemplary and in no way limiting. As mentioned, numeric values used are solely for the sake of simplicity, being otherwise understood that any pool window size, stride size and input/output size may be used in one or more embodiments.

As mentioned, in general pooling operators share combination properties with addition operators since are commutative and have an absorbing element: if an element is combined with the absorbing element, the element doesn't change.

Figure 6:
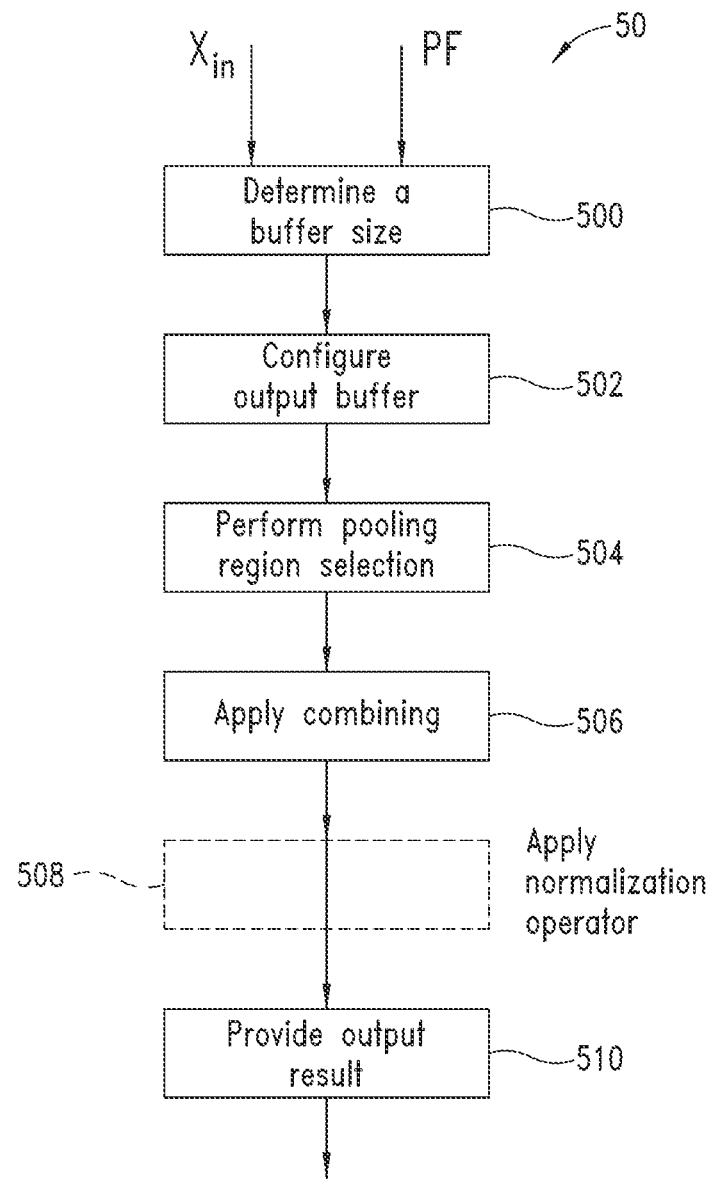
FIG. 6 is a diagram of a method of data processing as per the present disclosure.

In one or more embodiments as exemplified in FIG. 6, a method 50 of performing pooling processing VF may comprise:

providing input data Xin comprising at least one array Xin having an input size;

providing a pooling operator PF having an absorbing element value $o_i$ and a set of pooling parameters c, s, p comprising pooling window size, pooling stride size and pooling pad size, for instance a pooling operator selected from among known pooling operators such as maximum pooling, average pooling and linear pooling;

computing 500 a buffer size $d_{oc}$, $d_{of}$, $d_{op}$ of an output buffer B3 as a function of said set of pooling parameters c, s, p, for instance as a result of performing output shape inference processing, as discussed in the foregoing;

configuring and initializing 502 at least one output buffer B3 having the computed buffer size $d_{oc}$, $d_{of}$, $d_{op}$, the output buffer B3 having a number of buffer elements B3(1), B3(2), B3(3), B3(4) being function of to the computed buffer size; and initializing 502 the buffer elements B3(1), B3(2), B3(3), B3(4) of the output buffer B3 to have the value of the absorbing element $o_i$ of the selected pooling operator PF.

For instance:

when a "max" pooling operator PF is employed in performing inverted pooling VF, the absorbing element may have a respective value, e.g., $o_i=-\infty$, and normalization may not be performed; and when an "average" pooling operator PF is employed in performing inverted pooling VF, the absorbing element may have a respective value, e.g., $o_i=0$, and normalization may comprise dividing the output Xout by the input size of the padding window.

In one or more embodiments, the method 50 may further comprise:

performing pooling region selection 504 which may comprise determining, as a function of the pooling parameters c, s, the input elements $X_{in}(i)$ that affects output element $X_{out}(j)$.

In one or more embodiments, performing region selection 504 may comprise computing range limit values, for instance including a starting index $x_{start}$ and a termination index $x_{end}$, wherein to start and end the computation of a j-th output element index $x_o$, wherein the beginning and end elements are determined using the following expressions:

$$x_{start} = \max\left(\left\lfloor\frac{x_i+p+s-c}{s}\right\rfloor, °0\right), x_{end} = \min\left(\left\lfloor\frac{x_i+p}{s}\right\rfloor, °\text{size}-1\right)$$

wherein $x_i$ is the index of the i-th element of the input array Xin.

In one or more embodiments, the method 50 may further comprise:

applying linear combining 506 the respective elements B3(1), B3(2), B3(3), B3(4) of output buffer B3 with all the inputs affecting it for a respective pooling window PW;

iterating performing pooling region selection 504 for all elements of the input array Xin and repeatedly combining 506 output elements with input elements;

optionally 508, applying a normalization operator g; and providing 510 the output result Xout stored in the output buffer B3 to a user circuit.

One or more embodiments initializing the output facilitates combining an (existing) output value with the input. Such an operation may prove particularly advantageous in a case of applying pooling processing having a "large" padding size, for instance when padding size is greater than window size p>c. In such cases, as mentioned, some output values do not depend on the input and may not be used.

Figure 9:
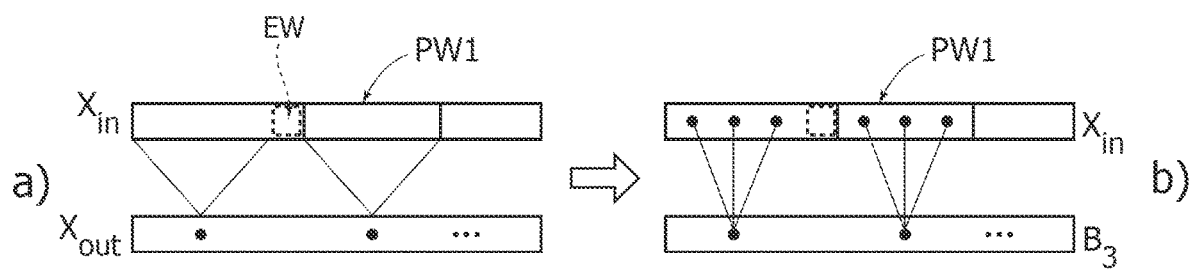

In such a scenario as exemplified in FIG. 9, the method 50 facilitates avoiding wasting computational resources on loading values which fall in an empty interval at the pad border. For instance, the pooling processing time may be reduced if an empty interval is detected, facilitating improved efficiency.

Final optional normalization facilitates providing a method flexible, adjustable to any pooling function one may use in different applications.

Figure 7:
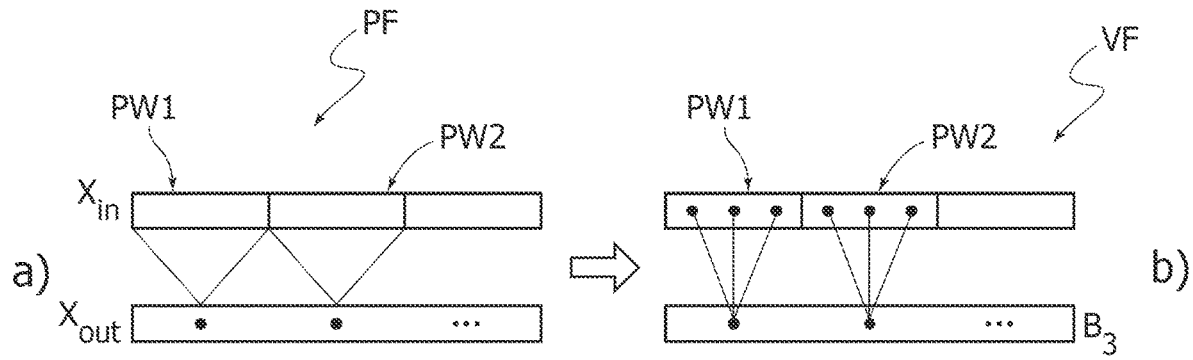
FIGS. 7 to 9 comprise diagrams exemplary of principles underlying one or more embodiments.
Figure 8:
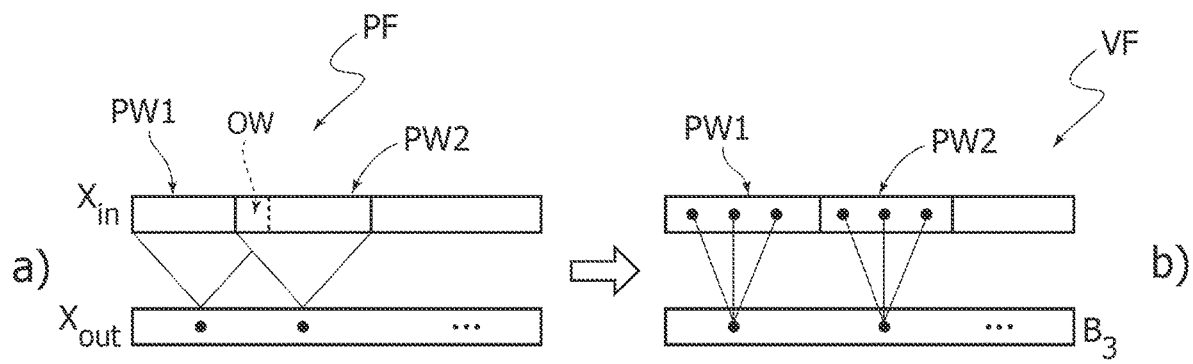

FIGS. 7 to 9 comprise diagrams exemplary of principles underlying performing region selection 504, determining the input elements Xin(i) that affects output element Xout(j) as a function of the pooling parameters c, s of the pooling operator PF used in inverted pooling VF.

Computation of the j-th output index $x_o$ may comprise looping through all the indexed elements of the input array Xin and selecting those having indexes within the range limits of the computed interval, and performing a (linear) combination of input value with their current output values.

Such an operation may be expressed as:

$$out(x_o)=f(in(x_i), °out(x_o))$$

In a first exemplary scenario as exemplified in portion a) of FIG. 7, pooling parameter may have no padding, e.g., p=0, and stride size equal to the pooling window size, e.g., s=c. As a result, applying pooling processing PF may comprise computing the selected pooling function (max, average, etc.) on elements of the input array Xin which fall within non overlapping pooling regions PW1, PW2. Such an interval may be expressed as:

$$x_i \in [x_o \cdot s, °(x_o+1)\cdot s-1]$$

As a result, selected 504 pooling regions PW1, PW2 may be adjacent one to the other. The i-th input element at index $x_i$ contributes solely to an index element value of the j-th output element index. For instance, this index may be expressed as: $x_o=\lfloor x_i/s \rfloor$, where $x_i$ is an input element index/coordinate and $x_o$ is an output element index/coordinate.

As exemplified in portion b) of FIG. 7, in such an exemplary scenario, in the hypothesis of having an input size $d_i=L=6$, performing inverted pooling VF may comprise providing 502 an output buffer B3 having a respective output buffer size which may be computed as: $d_o=\lceil(d_i-c+p_{left}+p_{right})/s\rceil+1=\lceil(6-3)/3\rceil+1=3$.

In a second exemplary scenario as exemplified in portion a) of FIG. 8, pooling parameters may differ from those discussed with respect to portions a), b) of FIG. 7 in that stride size may be smaller than pooling window size, e.g., s<c. As a result, applying pooling processing PF may comprise overlapping regions OW. Consequently, the i-th input element at index $x_i$ contributes to value of the j-th output element at index $x_o$ expressed as:

$$°x_o \in [\lfloor (x_i + s - c)/s \rfloor, \lfloor x_i/s \rfloor]. \qquad 5$$

In other words, the output "looks back" by "pool size" elements to find the inputs contributing to it but it advances solely by "stride" elements for each output, as exemplified in portion b) of FIG. 8.

In a third exemplary scenario as exemplified in portion a) of FIG. 9, pooling parameters may differ from those discussed with respect to portions a), b) of FIGS. 7 and 8 in that stride size may be bigger than pooling window size, e.g., s>c. As a result, applying pooling processing PF may comprise empty regions EW. Consequently, The i-th input element at index $x_i$ contributes to value of the j-th output element at index $x_o$ expressed as: $x_o \in [\lfloor (x_i+s-c)/s \forall, \lfloor (x_i+s)/s \rfloor]$ although sometimes the interval may be empty, leading to the presence of "disconnected" regions. For instance, if $\lfloor (x_i+s-c)/s \rfloor > \lfloor x_i/s \rfloor$, then the i-th input element at index $x_i$ does not contribute to the output at index $x_o$.

In a more general case, comprising non-zero padding size, e.g., p≠0, left pad $p_{left}$ may contribute to a shift for an i-th input element at index $x_i$, while a right pad $p_{right}$ may be implicitly accounted for by the output size determination 504, as discussed in the foregoing. In such scenarios, intervals may be clamped at the start index, e.g., $x_{start}=0$, and end index, e.g., $x_{end}=(size-1)$.

As mentioned, while being discussed mainly with respect to input arrays having a linear array shape, one or more embodiments may be suitable to process and kind of input data, for instance a bidimensional image array.

Figure 10:
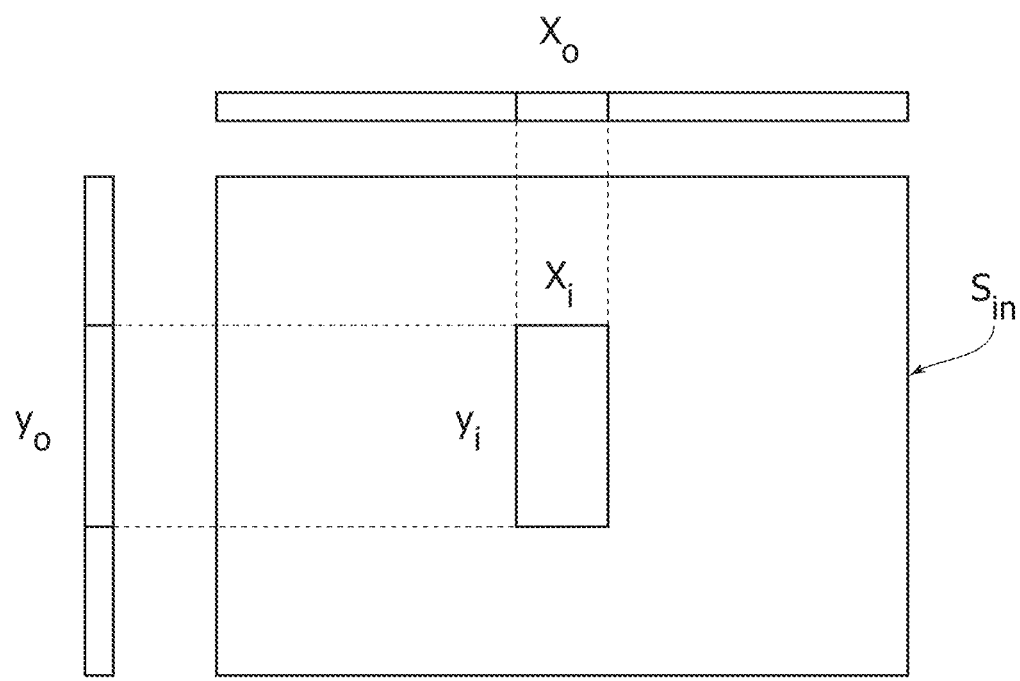
FIG. 10 is a diagram exemplary of a bidimensional input array.

FIG. 10 is a diagram exemplary of a bidimensional input array $S_{in}$ whose elements or pixels may be processed as a matrix of elements having cartesian coordinates Xin, Yin and whose elements may be indicated as $x_i$, $y_i$. Consequently, inverted pooling processing VF may be applied to elements in both the horizontal and vertical plane, leading to respective output value indices $x_o$, $y_o$.

Figure 11:
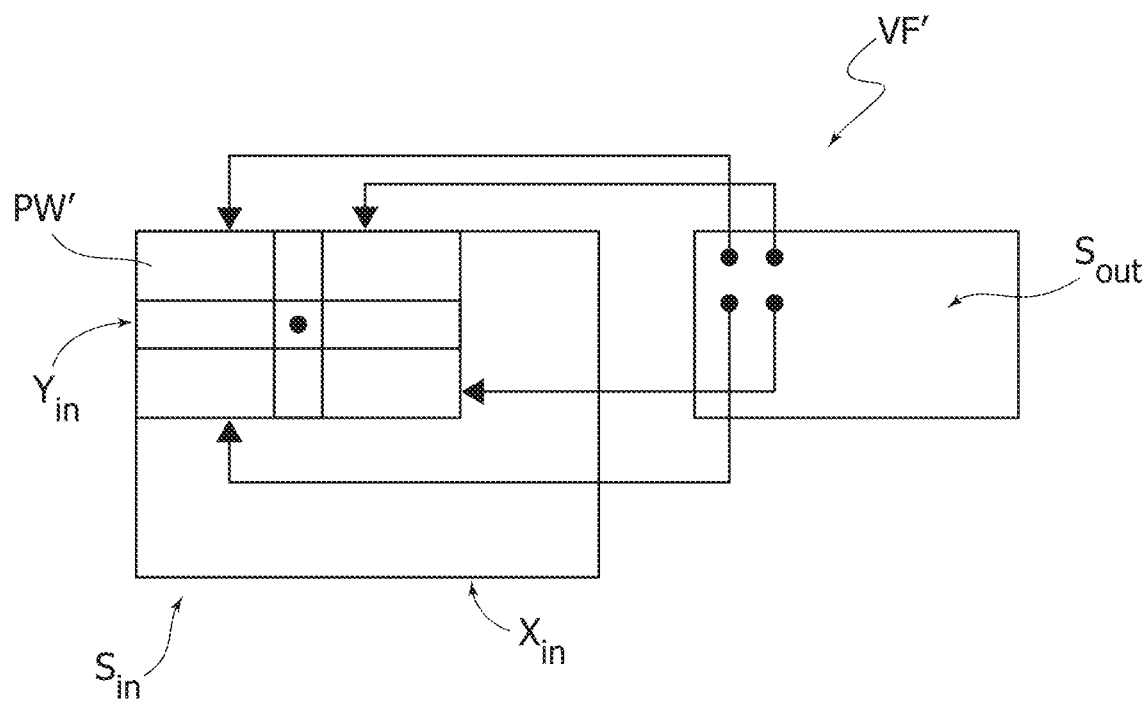
FIG. 11 is a diagram exemplary of principles underlying one or more embodiments.

FIG. 11 is a further diagram exemplary of principles underlying one or more embodiments, wherein a bi-dimensional inverted pooling operator VF' may be applied to process input arrays $X_{in}$, $Y_{in}$, where moving the pooling window PW' different data may affect respective output values in the output Sout.

In one or more embodiments as exemplified in FIG. 11, an output bi-dimensional array Sout may be obtained as a result of applying inverted pooling processing VF' to the image $S_{in}$.

Figure 12:
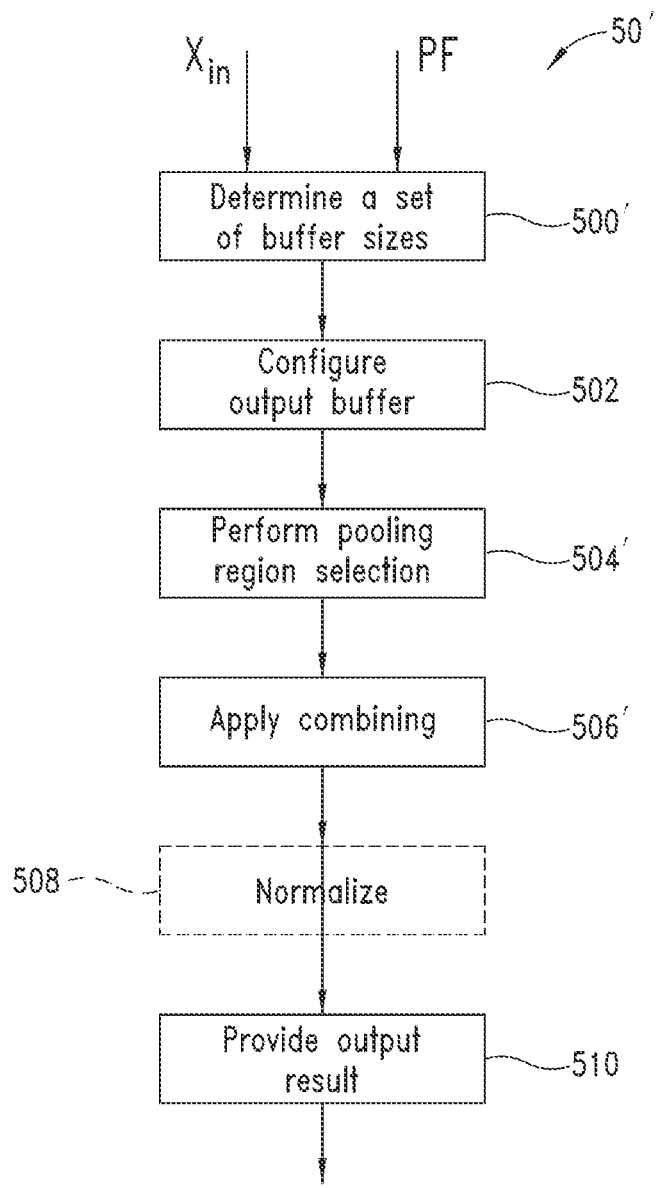
FIG. 12 is a diagram exemplary of one or more embodiments of a method as per the present disclosure, e.g., as applied on bidimensional images.

FIG. 12 is exemplary of operations of a method 50' of performing bi-dimensional inverted pooling VF', comprising:
providing input array $S_{in}$ comprising at least a first, e.g., horizontal, array of coordinates Xin, having a first input size Lx and a second, e.g., vertical, array of coordinates Yin having a second input size Ly;
providing a pooling operator PF having an absorbing element value $o_i$ and a set of pooling parameters c, s, p comprising pooling window size, pooling stride size and pooling pad size, for instance a pooling operator selected from among known pooling operators such as maximum pooling, average pooling and linear pooling; and
computing 500' a set of buffer sizes $d_{oc}$, $d_{of}$, $d_{op}$ of an output buffer B3 as a function of said set of pooling parameters c, s, p, for instance as a result of performing output shape inference processing, as discussed in the foregoing; specifically, for a bidimensional image computing a buffer size may comprise computing a first buffer horizontal size and a second buffer vertical size, the buffer being representable as a matrix of column-wise and row-wise elements.

In one or more embodiments, the method 50' may further comprise:
providing 502 at least one output buffer B3 having the computed buffer size(s) $d_{oc}$, $d_{of}$, $d_{op}$, the output buffer B3 having a number of buffer elements B3(i,j) being function of to the computed buffer size;
initializing 502 the buffer elements B3(i,j) of the output buffer B3 to have the value of the absorbing element $o_i$ of the selected pooling operator PF; and
performing pooling region selection 504' which may comprise determining, as a function of the pooling parameters c, s, the input element indices Xin(i), Yin(i) that affects the output buffer element B3(i,j).

In one or more embodiments, performing region selection 504' may comprise computing range limit values, namely a set of starting indices $x_{start}$, $y_{start}$ and a set of termination indices $x_{end}$, $y_{end}$ configured to trigger start and end of the computation of a j-th output element value at index $x_o$, wherein the beginning and end indices are determined using the following expressions:

$$x_{start} = \max\left(\left\lfloor \frac{x_i + p + s - c}{s} \right\rfloor, °0\right), x_{end} = \min\left(\left\lfloor \frac{x_i + p}{s} \right\rfloor, °\text{size} - 1\right)$$

$$y_{start} = \max\left(\left\lfloor \frac{y_i + p + s - c}{s} \right\rfloor, °0\right), x_{end} = \min\left(\left\lfloor \frac{y_i + p}{s} \right\rfloor, °\text{size} - 1\right)$$

wherein $x_i$ is the i-th index/coordinate element of the first input array Xin and $x_i$ is the i-th index/coordinate element of the second input array Yin.

In one or more embodiments, the method 50 may further comprise:
applying (linear) combining 506' the respective elements B3(1), B3(2), B3(3), B3(4) of output buffer B3 with all the inputs affecting it for a respective pooling window PW; specifically, such a combination may be expressed as: $o(x,y)=f(o(x,y), i(x_i, y_i))$;
iterating performing pooling region selection 504' for all elements of the input array Xin and repeatedly combining 506' output elements with input elements;
optionally 508, applying a normalization operator g; and
providing 510 the result stored in the output buffer B3 to a user circuit.

Figure 13:
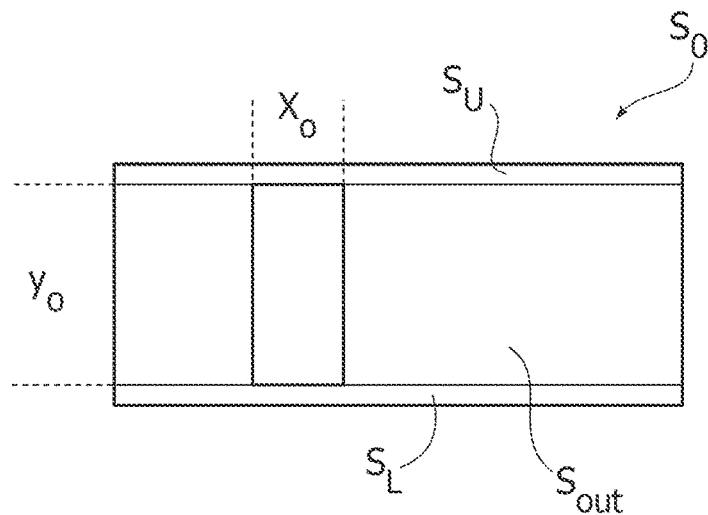
FIG. 13 is an exemplary diagram of one or more embodiments of a method as per the present disclosure.

In one or more embodiments as exemplified in FIG. 13, inverted pooling processing VF may be applied in a "streaming" mode, wherein the inverted pooling processing VF may be applied to data "on-the-fly" as in a "first come first served" processing logic.

For instance, as exemplified in FIG. 13, data may be packed so as to be structured as follows:
a first "front" row $S_L$ may be added to one first, e.g., bottom end of the input and may be used to store initialization values of the selected pooling operator PF;
a second "front" row $S_U$ may be added to a second, e.g., top end, opposite the first end, and used to store final (normalized) values which may be obtained, for instance, after optional normalization; and values of the output array Sout may be sandwiched between the first and the second end of the data structure.

Using such a data structure, a streamed array So may be obtained, facilitating sequential computation of pooling operations.

For instance, once the initialization is performed on the bottom row $S_L$ pooling may be computed on the middle rows, using as size for the output buffer B3 as discussed in the foregoing which may be inferred using the pool interval. In the example considered, optional final normalization may be performed and stored using the top row $S_U$.

One or more embodiments may thus facilitate obtaining a burning front behavior, wherein the input Sin is progressively consumed from top to bottom.

In one or more embodiments, further additional/optional operations (e.g., Nonlinearities, quantization) may be merged with the normalization step, improving efficiency.

In one or more embodiments, normalized values may be stored in a second output buffer or stripe to process pipelined operations, e.g., a subsequent convolution layers, contributing to save memory.

In one or more embodiments, range limit values may comprise initializing the index/coordinate values of the stripe SL to a value k, e.g., x=k.

For instance, in one or more embodiments, while x satisfies a given condition, e.g., x<s, it may be incremented and the interval limit values computed $x_{start}$, $x_{end}$ (see, for instance, FIG. 10). For instance, such interval limit values may be advantageously be computed as $$\left\lfloor \frac{x_i + k}{s} \right\rfloor,$$

wherein values conte using to the output may change values only after $x_i$ has been incremented s times.

One or more embodiments may facilitate a fast implementation, using increment, compare and reset stages.

For each value in [$x_{start}$, $x_{end}$], its memory access location indexes may be generated and the output computed, iterating the computation by incrementing the value again until the set condition is satisfied.

One or more embodiments may relate to a corresponding hardware implementation, wherein:
- an operation of checking that x satisfies a given condition, e.g., x<s, may comprise providing a register configured to store a threshold value and performing a (fast) comparing between the value of x and the threshold stored;
- iterating the computation may comprise providing a simple register reset; and
- memory accesses may be resolved by a dynamic memory access (DMA) component converting coordinates to memory addresses.

One or more embodiments, advantageously, may present a memory consumption comparable with the memory consumption footprint found using the naive approach, in particular when using the streamlined processing as exemplified in FIG. 13 where the output is updated on-the-fly.

One or more embodiments may have an efficiency comparable with that of the striped approach, in particular when stride size s is smaller than pool size c.

Table I below summarizes experiment results indicative of the advantageous performance of applying the computer implemented method as discussed herein may provide. Specifically, experiments are performed using the following parameters:
- zero padding size, p=0;
- fixed pooling window size c=5;
- varying stride size s=5 or s=2; and
- input image Sin having a size Lx=25 and Ly=25.

In the experiment considered, pooling has been performed following a Conv2D layer using a 3×3 filter, 8 input and 8 output channels, and padding=1.

As shown in Table I, using an approach as exemplified herein complexity may be reduced with respect to naive pooling PF, and memory consumption may be reduced with respect to striped pooling SF.

TABLE I

Summary of Experiments

| Stride | | not merged | naïve | stripe | inverted | improv. |
|---|---|---|---|---|---|---|
| s = 5 | MACC | 360625 | 360625 | 360625 | 360625 | 0% |
|  | memory | 5200 | 200 | 1200 | 200 | 83% |
| s = 2 | MACC | 364225 | 2437825 | 364225 | 364225 | 85% |
|  | memory | 6352 | 1352 | 2352 | 1352 | 43% |

One or more embodiments may be suitable to be used also to improve performing convolution operations.

Applying convolution operator CF may be seen as applying a weighted form of pooling.

Specifically, average pooling without partial pooling regions is a convolution wherein weights have all a same value inversely proportional to the window size value, e.g., weight $w_0=w_1=w_2=1/c$.

For instance, transposed convolution with stride=1 may be equivalent to convolution, wherein it is implemented by weighting the input with the filter and accumulating it in the output.

Figure 14:
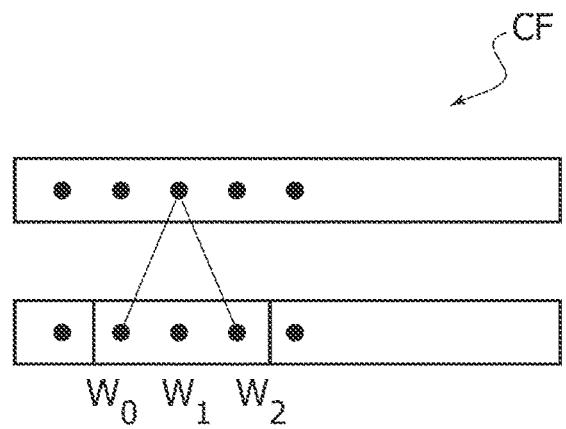
FIG. 14 is a diagram of principles underlying one or more embodiments.

In one or more embodiments, using the method 50 to apply a convolution operator CF as exemplified in FIG. 14 may comprise multiplying an input value $x_i$ by respective (filter) weight coefficients $\omega_2$, $\omega_1$, $\omega_0$.

As exemplified herein, applying the convolution operator CF may comprise:
- access weight coefficients $\omega_2$, $\omega_1$, $\omega_0$, e.g., in reverse order, using a relative output index $x_r$, which may be expressed as:

$$x_r = x_o - x_{start}$$

where
$x_o$ is the index of the j-th output element, and
$x_{start}$ is the index of the considered input element.

If the j-th output element at index $x_o$ is outside an interval of valid output indices, a computed relative output index $x_r$ may be discarded.

In the case of stride size s>1, the relative output index may be expressed as:

$$x_r = s \cdot (x_0 - x_{start}) + x_o \mod s$$

In one or more embodiments, multiple relative output indices may be used, for instance a first relative output index $x_r$ and a second relative output index $y_r$ may be computed and used to access corresponding (bidimensional) filter coefficients.

Figure 15:
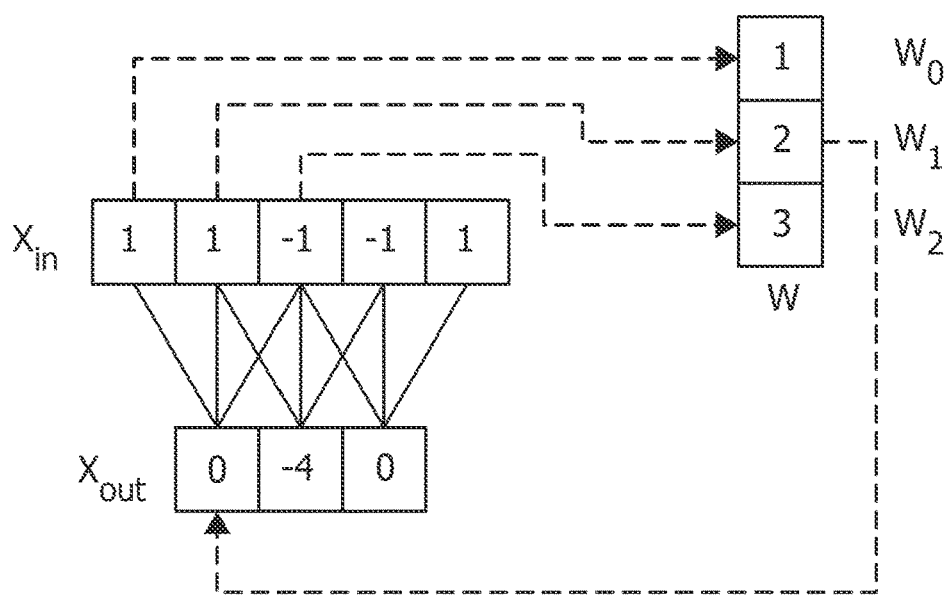
FIGS. 15 and 16 are diagrams exemplary of principles underlying one or more embodiments.
Figure 16:
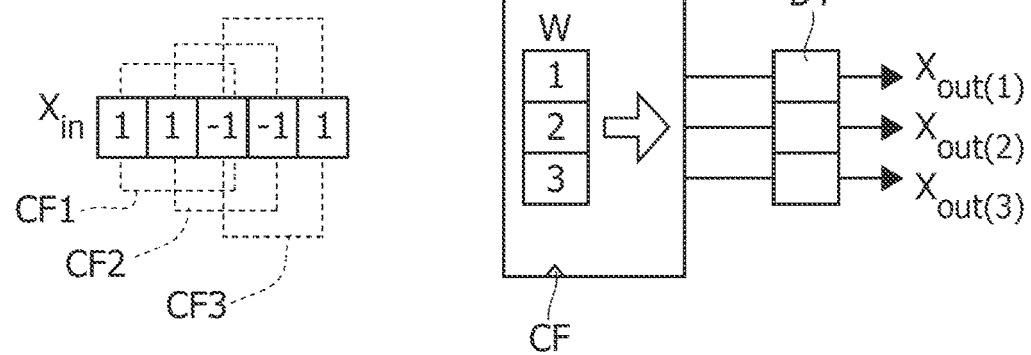
Figure 16:
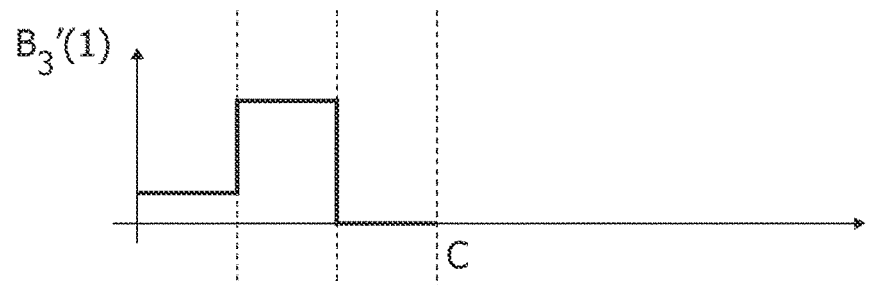
Figure 16:
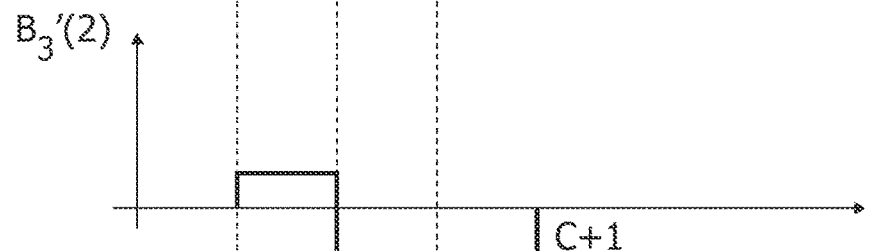
Figure 16:
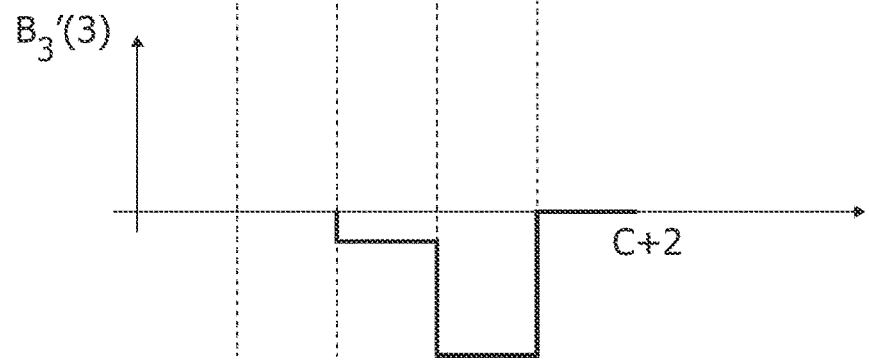

For instance, as exemplified in FIGS. 15 and 16, applying convolution of a filter W having weights $\omega_2$, $\omega_1$, $\omega_0$, e.g., $W=(\omega_0,\omega_1,\omega_2)=(1,2,3)$, corresponding to a pooling window size c=3, the filter W to be convoluted with an input vector $X_{in}$, e.g., $X_{in}=(X_{in}[0], X_{in}[1], X_{in}[2], X_{in}[3], X_{in}[4])=(1,1,-1,-1,1)$, the convolution application involving stride size s=1.

As exemplified in FIGS. 15 and 16, performing convolution of Xin, W may result in an output vector having three values, $Xout=(W\cdot X_{in}[0:2], W\cdot X_{in}[1:3], W\cdot X_{in}[2:4])=(X_{out}(0), X_{out}(1), X_{out}(2))=(0,-4,0)$, for instance.

For instance, as exemplified in FIG. 15:

- the first input value $X_{in}(0)$ affects outputs with indices $X_{out}(0)$, with the first input value multiplied by the first weight value $\omega_0$;
- the second input value $X_{in}(1)$ affects $X_{out}(0)$, $X_{out}(1)$ with the second input value $X_{in}(1)$ contributing to the first output value $X_{out}(0)$ when multiplied by the second weight value $\omega_1$ and contributing to the second output value $X_{out}(1)$ when multiplied by the first weight $\omega_0$;
- the third input value $X_{in}(2)$ affects the output elements $X_{out}(2)$, $X_{out}(1)$, $X_{out}(0)$, with contribution to the first and second outputs already calculated, so that $X_{out}(0)$ has now the final value and may be output by the buffer;
- the fourth input $X_{in}(3)$ may affect indices $X_{out}(1)$, $X_{out}(2)$, $X_{out}(3)$ but the output has size c=3 so that only $X_{out}(1)$, $X_{out}(2)$ are affected while $X_{out}(3)$ is discarded; there is contribution only to $X_{out}(1)$ and $X_{out}(2)$ respectively, so that $X_{out}(1)$ has the final value; and
- the fifth input $X_{in}(4)$ affects only $X_{out}(2)$, giving the final output value for $X_{out}(2)$.

In one or more embodiments, inversion of the order in the filter coefficients W may facilitate speeding up computation as the lower output indices to be visited are the earliest ones, and thus the ones for which the computation of the filtered output is completed sooner.

As exemplified in FIG. 16, applying such a method 50 of performing an "inverted" convolution operator CF of the striped pooling implementation may comprise:

- as exemplified in portion a) of FIG. 16, applying the convolution window CW to the input data Xin in subsequent windows CW1, CW2, CW3, wherein each window is separated from the sequent by an index-element distance equal to the stride size s, for instance distance s=1;
- the respective data windows are "scanned", wherein values comprised in the first window CW1 are simultaneously accumulated in subsequent indexed memory portions B4(i) of the temporary buffer B4, as exemplified in portions b) to d) of FIG. 16 showing possible time diagrams of values stored in an output buffer B3 configured to store four elements B4(1),B4(2),B4(3); and
- an output signal Xout(i) is provided whenever data which belongs to a respective convolution window CW1, CW2, CW3, CW4 has been accumulated in the output buffer B4, e.g., fully accumulated after an optional finalization, computing the pooling operator concurrently with the loading of data as exemplified in portions b) to d) of FIG. 16 and as discussed in the following.

Specifically, in the considered example as exemplified in portions b) to d) of FIG. 16, for instance:

- during a first clock cycle, a first value Xin(0) of a first element of the input data Xin within a first window CW1 may be loaded multiplied by the first weight w0 to a first element B4(1) of the output buffer B4;
- in a subsequent second clock cycle, a second element Xin(1) of the input data Xin within the first window CW1 may be accumulated, weighted by w2, in the first element B4(1), that is added to the first value Xin(0)w0 stored in the first element B4(1), and loaded, weighted by w1, to a second element B4(2) of the output buffer B4;
- in a subsequent third clock cycle, a third element Xin(2) of the input data Xin within the first window CW1 may be simultaneously accumulated, weighted by w2, in the first element B4(1), accumulated, weighted by w1, in the second element B4(2) and loaded, weighted by w0, to a third element B4(3) of the output buffer B4;
- in a subsequent fourth clock cycle, a fourth element Xin(3) of the input data Xin within the first window CW1 may be simultaneously accumulated, weighted by w1, into the second B4(2) and, weighted by w0, third element B4(3) of the output buffer B4; and
- in subsequent fifth clock cycle, a fifth element Xin(4) of the input data Xin within the first window CW1 may be accumulated, weighted by w2, to the third element B4(3) of the output buffer B4.

As exemplified in portion a), b) and c) of FIG. 16, providing the result of the convolution may use a possibly reduced of clock cycles.

It is noted, again, that the examples discussed in the foregoing are purely exemplary and in no way limiting. As mentioned, numeric values used are solely for the sake of simplicity, being otherwise understood that any pool window size, stride size and input/output size may be used in one or more embodiments.

As exemplified herein, a computer-implemented method (for instance, 50), comprises:

providing an input array (for instance, Sin; Xin) having an array size and comprising a set of ordered indexed elements having respective element indexes;

providing at least one of a pooling operator (for instance, PF) having an absorbing element value and a set of pooling parameters (for instance, c, s) comprising at least one of a pooling window size (for instance, c), a pooling stride size (for instance, s) and a pooling pad size (for instance, $p_{left}$, $p_{right}$), the pooling operator (for instance, PF, VF; VF') being selected from among a set of pooling operators; and applying said pooling operator to said input array by:

performing output shape inference processing comprising computing (for instance, 500) an output buffer size of an output buffer (for instance, B3) as a function of said set of pooling parameters;

providing (for instance, 502; 502') at least one output buffer (for instance, B3) having a buffer size equal to the computed output buffer size and assigning an initial value to buffer elements (for instance, B3(1), B3(2), B3(3), B3(4)) of the output buffer, the initial value equal to said absorbing element of the selected pooling operator (for instance, PF);

performing pooling region selection (for instance, 504) comprising determining, as a function of the pooling parameters, the input elements of the input array (for instance, Xin) that affect output elements of the output buffer (for instance, B3, Xout);

computing a combination (for instance, 506) of the respective elements of output buffer (for instance, B3) with the input elements affecting it for a respective pooling window (for instance, PW);

iterating performing pooling region selection (for instance, 504) and computing a linear combination (for instance, 506) for all elements of the input array; and providing (for instance, 510) the computed output result (for instance, Xout) stored in the output buffer to a user circuit.

As exemplified herein, said set of pooling operators comprises at least one of:
- a max pooling operator, having an absorbing element $o_i$ tending towards a minimum bottom end of a numeric representation interval; and
- an average pooling operator, having an absorbing element $o_i=0$ and a normalization factor equal to input array size.

As exemplified herein, the method comprises applying (for instance, 508) a normalization operator (for instance, g) to said result stored in the output buffer.

As exemplified herein, performing region selection (for instance, 504) comprises computing range limit values comprising a starting index and a termination index, configured to start and end the computation of an output element value, wherein the beginning index $x_{start}$ and end index $x_{end}$ are expressed as:

$$x_{start} = \max\left(\left\lfloor \frac{x_i + p + s - c}{s} \right\rfloor, 0\right), x_{end} = \min\left(\left\lfloor \frac{x_i + p}{s} \right\rfloor, size - 1\right)$$

wherein $x_i$ is the i-th index of the input array.

As exemplified herein, performing output shape inference processing comprises computing (for instance, 500) an output buffer size of an output buffer as a function of said set of pooling parameters, wherein said computation is selectable among at least one of:

a first output buffer size $d_{of}$ expressed as:

$d_{of} = \max(\lceil(d_i - c + p_{left} + p_{right})/s\rceil, 1)$ a second output buffer size $d_{oc}$ expressed as:

$d_{oc} = \lceil(d_i - c + p_{left} + p_{right})/s\rceil + 1$ a third output buffer size $d_{op}$ expressed as:

$d_{op} = \lceil(d_i + s - 1)/s\rceil + 1$

As exemplified herein, providing a pooling operator comprises:
- applying artificial neural network processing to said input array, the artificial neural network comprising at least one of a pooling or convolution data processing layer.

As exemplified herein, a micro-controller system comprises:
- a memory circuit block, including memory portions configured to be allocated or de-allocated to host data buffers; and
- at least one processing circuit coupled to said memory circuit block and configured to perform operations of the computer-implemented method.

As exemplified herein, a computer program product comprises software code portions which, when executed in at least one processing circuit, configure such at least one processing circuit to perform operations of the computer-implemented method (for instance, 50).

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

Various example embodiments are summarized below, with example references to the figures. In an embodiment, a computer-implemented method (50) comprises: providing an input array (Sin; Xin) having an array size and comprising a set of ordered indexed elements having respective element indexes, providing at least one of a pooling operator (PF) having an absorbing element value and a set of pooling parameters (c, s) comprising at least one of a pooling window size (c), a pooling stride size (s) and a pooling pad size ($p_{left}$, $p_{right}$), the pooling operator (PF, VF; VF') being selected from among a set of pooling operators, applying said pooling operator (PF, VF; VF') to said input array (Sin; Xin) by: performing output shape inference processing comprising computing (500) an output buffer size of an output buffer (B3) as a function of said set of pooling parameters (c, s); providing (502; 502') at least one output buffer (B3) having a buffer size equal to the computed output buffer size and assigning an initial value to buffer elements (B3(1), B3(2), B3(3), B3(4)) of the output buffer (B3), the initial value equal to said absorbing element of the selected pooling operator (PF); performing pooling region selection (504) comprising determining, as a function of the pooling parameters (c, s), which input elements of the input array (Xin) affect which output element of the output buffer (B3, Xout), computing a combination (506) of the respective elements of output buffer (B3) with the input elements affecting it for a respective pooling window (PW); iterating performing pooling region selection (504) and computing a linear combination (506) for all elements of the input array (Xin); providing (510) the computed output result (Xout) stored in the output buffer (B3) to a user circuit.

In an embodiment, the set of pooling operators comprises at least one of: a max pooling operator, having an absorbing element $o_i$ tending towards a minimum bottom end of a numeric representation interval, and an average pooling operator, having an absorbing element $o_i=0$ and a normalization factor equal to input array size. In an embodiment, the method comprises applying (508) a normalization operator (g) to said result (Xout) stored in the output buffer (B3). In an embodiment, performing region selection (504) comprises computing range limit values comprising a starting index and a termination index, configured to start and end the computation of an output index value, wherein the beginning index $x_{start}$ and end index $x_{end}$ are expressed as:

$$x_{start} = \max\left(\left\lfloor \frac{x_i + p + s - c}{s} \right\rfloor, 0\right), x_{end} = \min\left(\left\lfloor \frac{x_i + p}{s} \right\rfloor, size - 1\right)$$

wherein $x_i$ is the i-th index of the input array (Xin, Sin).

In an embodiment, performing output shape inference processing comprises computing (500) an output buffer size of an output buffer (B3) as a function of said set of pooling parameters (c, s), wherein said computation (500) is selectable among at least one of:

a first output buffer size $d_{of}$ expressed as:

$d_{of} = \max(\lceil(d_i - c + p_{left} + p_{right})/s\rceil, 1)$ a second output buffer size $d_{oc}$, expressed as:

$d_{oc}\lceil(d_i - c + p_{left} + p_{right})/s\rceil + 1$ or, a third output buffer size $d_{op}$ when padding size is zero, expressed as:

$$d_{op} = \lceil (d_i+s-1)/s \rceil + 1.$$

In an embodiment, providing a pooling operator comprises: applying artificial neural network processing to said input array, the artificial neural network comprising at least one of a pooling data processing layer and/or convolution data processing layer.

In an embodiment, a micro-controller system comprises: a memory circuit block, including memory portions configured to be allocated or de-allocated to host data buffers, and at least one processing circuit coupled to said memory circuit block and configured to perform operations of the computer-implemented method according to any of the methods disclosed herein. In an embodiment, a computer program product comprises software code portions which, when executed in at least one processing circuit, configure such at least one processing circuit to perform operations of the computer-implemented method (50) of any of the methods disclosed herein.

In an embodiment, a method comprises: applying a pooling operator to an input array of data, the pooling operator having an absorbing element value and a set of pooling parameters, the applying the pooling operator to the input array of data comprising: computing a size of an output buffer as a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array of a pooling window with output elements of the output buffer; and combining, for each output element of the output buffer, the respective input elements associated with the output element. In an embodiment, the combining includes determining a combination of respective elements of the output buffer with the input elements associated with the output elements. In an embodiment, the combining includes applying a weight to an input element.

In an embodiment, the input array has an array size and a set of ordered indexed elements having respective element indexes. In an embodiment, the pooling operator is selected from a set of pooling operators, and the set of pooling operators comprises at least one of: a max pooling operator, having an absorbing element tending towards a minimum bottom end of a numeric representation interval; and an average pooling operator, having an absorbing element of zero and a normalization factor equal to an input array size. In an embodiment, the set of pooling parameters comprise at least one of a pooling window size, a pooling stride size and a pooling pad size. In an embodiment, the method comprises applying a normalization operator to the output array of data.

In an embodiment, associating elements of the input array comprises computing range limit values comprising a starting index and a termination index of the pooling window. In an embodiment, the starting index $x_{start}$ and the terminating index $x_{end}$ are determined according to:

$$x_{start} = \max\left(\left\lfloor \frac{x_i+p+s-c}{s} \right\rfloor, 0\right), x_{end} = \min\left(\left\lfloor \frac{x_i+p}{s} \right\rfloor, \text{size}-1\right)$$

wherein $x_i$ is the i-th index of the input array, p is the pooling pad size, c is the pooling window size, and s is the stride size. In an embodiment, computing the size of the output buffer as a function of said set of pooling parameters comprises selecting: a first output buffer size $d_{of}$ according to: $d_{of} = \max(\lceil (d_i-c+p_{left}+p_{right})/s \rceil, 1)$ a second output buffer size $d_{oc}$ according to: $d_{oc} = \lceil (d_i-c+p_{left}+p_{right})/s \rceil + 1$; or a third output buffer size $d_{op}$ when padding size is zero, according to: $d_{op} = \lceil (d_i+s-1)/s \rceil + 1$, where c is the pooling window size, s is the stride size, $p_{left}$ is the pad size on the left edge, $p_{right}$ is the pad size on the right edge, $d_i$ is the input array length-size. In an embodiment, the method comprises: applying artificial neural network processing to said input array, the pooling operator being applied in a pooling data processing layer, or a convolution data processing layer.

In an embodiment, a micro-controller system comprises: memory; and processing circuitry coupled to the memory, wherein the processing circuitry, in operation, applies a pooling operator to an input array of data, the pooling operator having an absorbing element value and a set of pooling parameters, the applying the pooling operator to the input array of data comprising: allocating a portion of the memory to an output buffer, the output buffer having a size that is a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array of a pooling window with output elements of the output buffer; and combining, for each output element of the output buffer, the respective input elements associated with the output element. In an embodiment, the combining includes determining a combination of respective elements of the output buffer with the input elements associated with the output elements. In an embodiment, the combining includes applying a weight to an input element.

In an embodiment, a micro-controller system comprises an interface configured to couple the micro-controller system to other processing units or actuating devices. In an embodiment, a micro-controller system comprises a bus system coupling the processing circuitry and the memory to exchange data therebetween. In an embodiment, the input array has an array size and a set of ordered indexed elements having respective element indexes. In an embodiment, the pooling operator is selected from a set of pooling operators, and the set of pooling operators comprises at least one of: a max pooling operator, having an absorbing element tending towards a minimum bottom end of a numeric representation interval; and an average pooling operator, having an absorbing element of zero and a normalization factor equal to an input array size. In an embodiment, a micro-controller system comprises set of pooling parameters comprise at least one of a pooling window size, a pooling stride size and a pooling pad size. In an embodiment, a micro-controller system comprises applying a normalization operator to the output array of data.

In an embodiment, associating elements of the input array comprises computing range limit values comprising a starting index and a termination index of the pooling window. In an embodiment, the starting index $x_{start}$ and the terminating index $x_{end}$ are determined according to:

$$x_{start} = \max\left(\left\lfloor \frac{x_i+p+s-c}{s} \right\rfloor, 0\right), x_{end} = \min\left(\left\lfloor \frac{x_i+p}{s} \right\rfloor, \text{size}-1\right)$$

wherein $x_i$ is the i-th index of the input array, p is the pooling pad size, c is the pooling window size, and s is the stride size. In an embodiment, computing the size of the output buffer as a function of said set of pooling parameters comprises selecting: a first output buffer size $d_{of}$ according to: $d_{of}=\max(\lceil (d_i-c+p_{left}+p_{right})/s \rceil, 1)$ a second output buffer size $d_{oc}$ according to: $d_{oc}=\lceil (d_i-c+p_{left}+p_{right})/s \rceil +1$; or a third output buffer size $d_{op}$ when padding size is zero, according to: $d_{op}=\lceil (d_i+s-1)/s \rceil +1$ where c is the pooling window size, s is the stride size, $p_{left}$ is the pad size on the left edge, $p_{right}$ is the pad size on the right edge, $d_i$ is the input array length-size.

In an embodiment, a non-transitory computer-readable storage medium whose stored contents configure a computing system, implements a method, the method comprising: applying a pooling operator to an input array of data, the pooling operator having an absorbing element value and a set of pooling parameters, the applying the pooling operator to the input array of data comprising: computing a size of an output buffer as a function of the set of pooling parameters; initializing elements of the output buffer to the value of the absorbing element of the pooling operator; and generating an output array of data stored in the output buffer, the generating the output array of data including, for a plurality of iterations associated with respective pooling windows: associating, as a function of the pooling parameters, elements of the input array with output elements of the output buffer; and combining, for each output element of the output buffer, the respective input elements associated with the output element. In an embodiment, the combining includes determining a combination of respective elements of the output buffer with the input elements associated with the output elements. In an embodiment, the combining includes applying a weight to an input element. In an embodiment, the input array comprises an array size and a set of ordered indexed elements having respective element indexes. In an embodiment, the pooling operation is selected from a set of pooling operations, and the set of pooling operators comprises at least one of: a max pooling operator, having an absorbing element tending towards a minimum bottom end of a numeric representation interval; and an average pooling operator, having an absorbing element and a normalization factor equal to input array size. In an embodiment, the set of pooling parameters comprise at least one of a pooling window size, a pooling stride size and a pooling pad size. In an embodiment, the contents comprise instructions, which when executed by the computing system, cause the computing system to perform the method.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for neural network processing, comprising:
applying a pooling operator to an input array of data to the neural network, the pooling operator having an absorbing element value and a set of pooling parameters, the applying the pooling operator to the input array of data comprising:
computing a size of an output buffer as a function of the set of pooling parameters, wherein the output buffer is a memory buffer;
initializing elements of the output buffer to the value of the absorbing element of the pooling operator; and
generating an output array of data stored in the output buffer, the generating the output array of data including, for a plurality of iterations associated with respective pooling windows:
associating, as a function of the pooling parameters, elements of the input array of a pooling window with output elements of the output buffer; and
combining, for each output element of the output buffer, the respective input elements associated with the output element; and
generating an output of the neural network based on a result of the combining of the respective input elements associated with the output element, wherein,
the input array has an array size and is indexed;
the associating elements of the input array comprises computing range limit values comprising a starting index and a termination index of the pooling window; and
the starting index $x_{start}$ and the terminating index $x_{end}$ are determined according to:

$$x_{start} = \max\left(\left\lfloor \frac{x_i + p + s - c}{s} \right\rfloor, 0\right), x_{end} = \min\left(\left\lfloor \frac{x_i + p}{s} \right\rfloor, size - 1\right)$$

wherein $x_i$ is the i-th index of the input array, p is a pooling pad size, c is a pooling window size, and s is a stride size.

2. The computer-implemented method of claim 1, wherein the combining includes determining a combination of respective elements of the output buffer with the input elements associated with the output elements.

3. The computer-implemented method of claim 1, wherein the combining includes applying a weight to an input element.

4. The method of claim 1, wherein the pooling operator is selected from a set of pooling operators, and the set of pooling operators comprises at least one of:
a max pooling operator, having an absorbing element tending towards a minimum bottom end of a numeric representation interval; and
an average pooling operator, having an absorbing element of zero and a normalization factor equal to an input array size.

5. The method of claim 1, wherein the set of pooling parameters comprise at least one of a pooling window size, a pooling stride size and a pooling pad size.

6. The method of claim 1, comprising applying a normalization operator to the output array of data.

7. The method of claim 1, wherein computing the size of the output buffer as a function of said set of pooling parameters comprises selecting:
a first output buffer size $d_{of}$ according to:

$$d_{of}=\max(\lceil (d_i-c+p_{left}30\ p_{right})/s \rceil, 1)$$

a second output buffer size $d_{oc}$ according to:

$$d_{oc}=\lceil (d_i-c+p_{left}+p_{right})/s \rceil +1; \text{ or}$$

a third output buffer size $d_{op}$ when padding size is zero, according to:

$$d_{op}=\lceil(d_i+s-1)/s\rceil+1$$

where c is a pooling window size, s is a stride size, $p_{left}$ is a pad size on a left edge, $p_{right}$ is a pad size on a right edge, $d_i$ is an input array length-size.

8. The method of claim 1, comprising:
applying artificial neural network processing to said input array, the pooling operator being applied in a pooling data processing layer, or a convolution data processing layer.

9. A micro-controller for neural network processing, comprising:
memory; and
processing circuitry coupled to the memory, wherein the processing circuitry, in operation, applies a pooling operator to an input array of data of the neural network, the pooling operator having an absorbing element value and a set of pooling parameters, the applying the pooling operator to the input array of data comprising:
allocating a portion of the memory to an output buffer, the output buffer being a memory buffer and having a size that is a function of the set of pooling parameters;
initializing elements of the output buffer to the value of the absorbing element of the pooling operator; and
generating an output array of data stored in the output buffer, the generating the output array of data including, for a plurality of iterations associated with respective pooling windows:
associating, as a function of the pooling parameters, elements of the input array of a pooling window with output elements of the output buffer; and
combining, for each output element of the output buffer, the respective input elements associated with the output element; and
generates an output of the neural network based on a result of the combining of the respective input elements associated with the output element, wherein
the input array has an array size and is indexed;
the associating elements of the input array comprises computing range limit values comprising a starting index and a termination index of the pooling window; and
the starting index $x_{start}$ and the terminating index $x_{end}$ are determined according to:

$$x_{start}=\max\left(\left\lceil\frac{x_i+p+s-c}{s}\right\rceil,0\right), x_{end}=\min\left(\left\lfloor\frac{x_i+p}{s}\right\rfloor, size-1\right)$$

wherein $x_i$ is an i-th index of the input array, p is a pooling pad size, c is a pooling window size, and s is a stride size.

10. The micro-controller of claim 9, wherein the combining includes determining a combination of respective elements of the output buffer with the input elements associated with the output elements.

11. The micro-controller of claim 9, comprising an interface configured to couple the micro-controller to other processing units or actuating devices.

12. The micro-controller of claim 9, comprising a bus system coupling the processing circuitry and the memory to exchange data therebetween.

13. The micro-controller of claim 9, wherein the pooling operator is selected from a set of pooling operators, and the set of pooling operators comprises at least one of:
a max pooling operator, having an absorbing element tending towards a minimum bottom end of a numeric representation interval; and
an average pooling operator, having an absorbing element of zero and a normalization factor equal to an input array size.

14. The micro-controller of claim 9, wherein the set of pooling parameters comprise at least one of a pooling window size, a pooling stride size and a pooling pad size.

15. The micro-controller of claim 9, wherein the processing circuitry, in operation, applies a normalization operator to the output array of data.

16. The micro-controller of claim 9, wherein computing the size of the output buffer as a function of said set of pooling parameters comprises selecting:
a first output buffer size $d_{of}$ according to:

$$d_{of}=\max(\lceil(d_i-c+p_{left}+p_{right})/s\rceil,1)$$

a second output buffer size $d_{oc}$ according to:

$$d_{oc}=\lceil(d_i-c+p_{left}+p_{right})/s\rceil+1; \text{ or}$$

a third output buffer size $d_{op}$ when padding size is zero, according to:

$$d_{op}=\lceil(d_i+s-1)/s\rceil+1$$

where c is a pooling window size, s is a stride size, $p_{left}$ is a pad size on a left edge, $p_{right}$ is a pad size on a right edge, $d_i$ is an input array length-size.

17. A non-transitory computer-readable storage medium whose stored contents configure a computing system to implement a method for neural network processing, the method comprising:
applying a pooling operator to an input array of data of a neural network, the pooling operator having an absorbing element value and a set of pooling parameters, the applying the pooling operator to the input array of data comprising:
computing a size of an output buffer as a function of the set of pooling parameters, wherein the output buffer is a memory buffer;
initializing elements of the output buffer to the value of the absorbing element of the pooling operator; and
generating an output array of data stored in the output buffer, the generating the output array of data including, for a plurality of iterations associated with respective pooling windows:
associating, as a function of the pooling parameters, elements of the input array of a pooling window with output elements of the output buffer; and
combining, for each output element of the output buffer, the respective input elements associated with the output element; and
generating an output of the neural network based on a result of the combining of the respective input elements associated with the output element, wherein,
the input array has an array size and is indexed;
the associating elements of the input array comprises computing range limit values comprising a starting index and a termination index of the pooling window; and the starting index $x_{start}$ and the terminating index $x_{end}$ are determined according to:

$$x_{start} = \max\left(\left\lfloor \frac{x_i + p + s - c}{s} \right\rfloor, 0\right), x_{end} = \min\left(\left\lfloor \frac{x_i + p}{s} \right\rfloor, \text{size} - 1\right)$$

wherein $x_i$ is an i-th index of the input array, p is a pooling pad size, c is a pooling window size, and s is a stride size.

18. The non-transitory computer-readable storage medium of claim 17,
wherein the combining includes determining a combination of respective elements of the output buffer with the input elements associated with the output elements.

19. The non-transitory computer-readable storage medium of claim 17, wherein the pooling operator is selected from a set of pooling operators, and the set of pooling operators comprises at least one of:
a max pooling operator; and
an average pooling operator, having an absorbing element and a normalization factor equal to input array size.

20. The non-transitory computer-readable storage medium of claim 17, wherein the set of pooling parameters comprise at least one of a pooling window size, a pooling stride size and a pooling pad size.

21. The non-transitory computer-readable medium of claim 17, wherein the
contents comprise instructions, which when executed by the computing system, cause the computing system to perform the method.

* * * * *

UNITED STATES PATENT AND TRADEMARK OFFICE
CERTIFICATE OF CORRECTION

PATENT NO. : 12,373,673 B2  
APPLICATION NO. : 17/369417  
DATED : July 29, 2025  
INVENTOR(S) : Emanuele Plebani Page 1 of 1

It is certified that error appears in the above-identified patent and that said Letters Patent is hereby corrected as shown below:

In the Claims

Column 26, Claim 7, Lines 63-64:
"$d_{of}=\max([(d_i-c+p_{left}\ 30\ p_{right})/s], 1)$"
Should read:
-- $d_{of}=\max([(d_i-c+p_{left} + p_{right})/s], 1)$ --

Signed and Sealed this  
Twenty-third Day of September, 2025

John A. Squires  
*Director of the United States Patent and Trademark Office*